United States Patent
Yu

(10) Patent No.: US 7,428,211 B2
(45) Date of Patent: Sep. 23, 2008

(54) TRANSMISSION APPARATUS AND METHOD OF MULTI-SERVICE TRIBUTARIES OVER RPR

(75) Inventor: Shaohua Yu, Hubei (CN)

(73) Assignee: Wuhan Fiberhome Networks Co. Ltd., Wuhan, Hubei (CN)

(*) Notice: Subject to any disclaimer, the term of this patent is extended or adjusted under 35 U.S.C. 154(b) by 255 days.

(21) Appl. No.: 10/535,473

(22) PCT Filed: Nov. 18, 2002

(86) PCT No.: PCT/CN02/00816

§ 371 (c)(1),
(2), (4) Date: Jan. 27, 2006

(87) PCT Pub. No.: WO2004/047374

PCT Pub. Date: Jun. 3, 2004

(65) Prior Publication Data

US 2006/0126651 A1 Jun. 15, 2006

(51) Int. Cl.
- H04L 12/42 (2006.01)
- H04L 12/56 (2006.01)
- G06F 15/16 (2006.01)

(52) U.S. Cl. .............. 370/223; 370/395.65; 370/404; 398/4; 709/251

(58) Field of Classification Search .......... 370/223, 370/395.65, 404; 398/4; 709/251
See application file for complete search history.

(56) References Cited

U.S. PATENT DOCUMENTS

| | | | |
|---|---|---|---|
| 5,544,161 A * | 8/1996 | Bigham et al. | 370/397 |
| 5,684,799 A * | 11/1997 | Bigham et al. | 370/397 |
| 5,719,862 A | 2/1998 | Lee et al. | |
| 5,822,298 A * | 10/1998 | Matsumoto et al. | 370/223 |
| 6,041,056 A * | 3/2000 | Bigham et al. | 370/395.64 |
| 6,256,292 B1 * | 7/2001 | Ellis et al. | 370/227 |
| 6,301,254 B1 * | 10/2001 | Chan et al. | 370/397 |
| 6,657,969 B1 * | 12/2003 | Neuendorff et al. | 370/245 |
| 6,795,446 B2 * | 9/2004 | Matsumoto et al. | 370/404 |
| 6,888,791 B1 * | 5/2005 | Ellis et al. | 370/227 |
| 6,993,047 B1 * | 1/2006 | Nigam et al. | 370/473 |
| 7,068,773 B2 * | 6/2006 | McCann et al. | 379/229 |
| 7,277,443 B2 * | 10/2007 | Goode et al. | 370/400 |
| 2002/0091862 A1 | 7/2002 | Ahn | |
| 2004/0105453 A1 * | 6/2004 | Shpak et al. | 370/404 |
| 2004/0184450 A1 * | 9/2004 | Omran | 370/372 |
| 2004/0252688 A1 * | 12/2004 | May et al. | 370/389 |

* cited by examiner

Primary Examiner—Alpus H Hsu
(74) Attorney, Agent, or Firm—Fish & Richardson P.C.

(57) ABSTRACT

A data transmission apparatus used in a multiple service ring is described. The apparatus includes at least two nodes coupled to at least one aggregate pipe and at least one tributary. The apparatus also includes a tributary TX framer for converting data received from the tributary, a transmission setup module for setting up information for processing protocol packets to be transmitted, a TX framer for encapsulating the information into frames of the MSR and transmitting the same along the aggregate pipe to a downstream neighbor node in the ring, and a RX framer for receiving and deframing data frames of the MSR from a upstream neighbor node. The apparatus also includes a transiting module for transiting the frames to the TX framer, a destination tributary determining module for determining a destination tributary, and a tributary RX framer for converting and sending protocol packets to a corresponding tributary.

30 Claims, 11 Drawing Sheets

Tx and Rx Diagram of a Data Node

MAC Architecture of IEEE 802.17 Lite based on MSR

Tx and Rx Diagram of a Data Node

Generic Protocol Stack of MSR Based on RPR Lite

Relationship between XP and RPR MAC, Upper Layer and XP

*FE field = "0", PT field = "3", Protocol type field is a fixed value.*

Generic Frame Format

Expressions of TN ID and TCCR ID

TDM SERVICE CHANNEL OVER RPR MAC FRAME USING XP

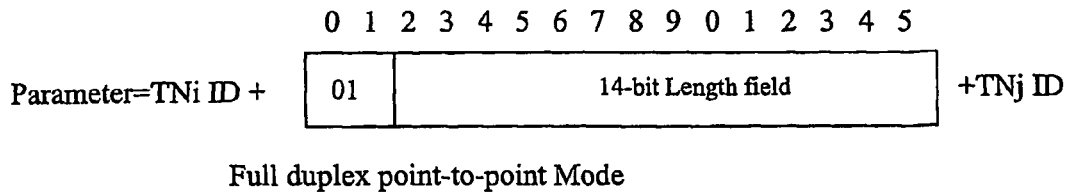

Full duplex point-to-point Mode

Fig. 8

Expressions of 1+1 and 1:1 tributary protection parameters

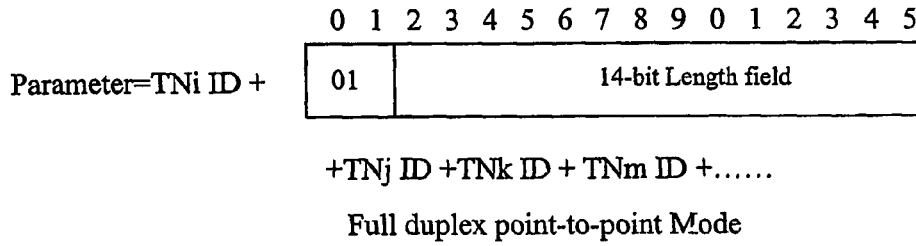

+TNj ID +TNk ID + TNm ID +......

Full duplex point-to-point Mode

Fig. 9

Expressions of 1:N tributary protection parameter

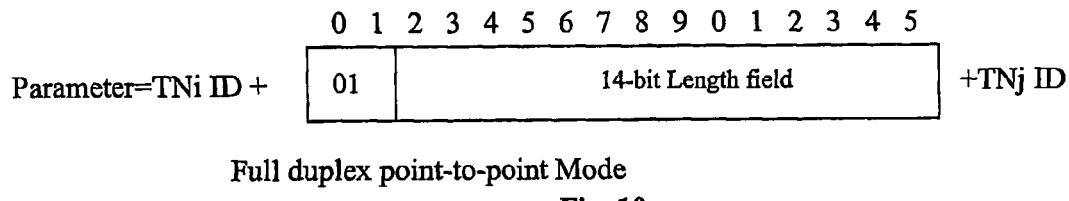

Full duplex point-to-point Mode

Fig. 10

Expressions of 1+1 and 1:1 tributary protection parameters

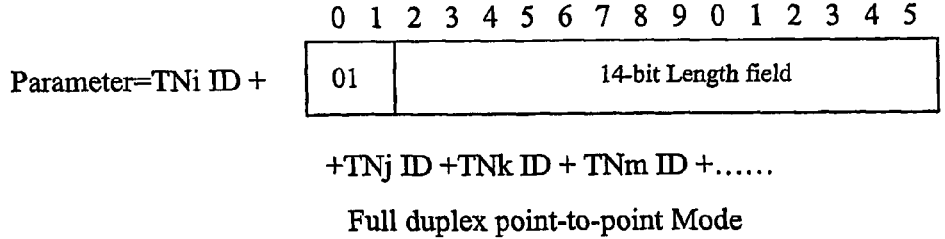

+TNj ID +TNk ID + TNm ID +......

Full duplex point-to-point Mode

Fig. 11

Expressions of 1:N tributary protection parameter

The Single Fibre Ring of RPR

A RPR Topology, Link-type with Adding and Dropping Tributary Services

A RPR Topology, Broadcast Conn.ction to DVB Application

A RPR Lite Topology, Pseudo-mesh Connection

The Physical Architecture of a RPR Lite node (Out-of-band CS&NM Bus)

The Physical Architecture of a RPR Lite node (in-band CS&NM Bus)

Layout of system equipment of a RPR Lite node

TRANSMISSION APPARATUS AND METHOD OF MULTI-SERVICE TRIBUTARIES OVER RPR

FIELD OF THE INVENTION

The present invention relates to Multiple Services Ring based on RPR in the way of pre-plan and connection based on RPR, specifically, relates to data transmission apparatus and method used as RPR MAC Client in MSR Based on RPR.

BACKGROUND ART

The expansion of business and personal use of data network services are driving the need to deploy data services infrastructure facilities with connection oriented and pre-plan method. The dynamic bandwidth allocation and differentiated services over an aggregate pipe, tributary based bandwidth management, security function, protection, multicast, performance monitoring and their applications in the different topologies are the basic requirements of carrier class. Therefore, the development of MSR data network, LEP and related application in this Patent needs at least to provide the following capabilities over RPR, including RPR Lite, as a MAC client:
(1) The protocol encapsulation and transport of Ethernet, Gigabit Ethernet, and G.702 PDH circuit—Synchronous and asynchronous circuit transport, Video signal, Voice-band signal, Digital channel supported by 64 kbit/s-based ISDN etc over a two-fibre ring, a single fibre ring, a link-type and broadcast topology of fibres.
(2) Service (or tributary) based protection of 1+1, 1:1, and 1:N models within 50 ms.
(3) Service or tributary based multicast and station-based multicast and broadcast.
(4) Bandwidth limitation of service (or tributary) based with symmetry and asymmetry.
(5) Line-speed filtering of tributary based.
(6) Tributary based performance monitoring in 15-minute and 24-hour.
(7) Frame based transparent PPPoE and PPPoA transport from access to backbone along a MSR ring or other topologies, in order to simplify accounting mechanism (e.g. Radius), reduce maintenance work, and improve latency variation (compared to Layer 2 and Layer 3 switch) in Access network application.

SUMMARY OF THE INVENTION

The object of the present invention is to provide data transmission apparatus and method used as RPR MAC Client in MSR based on RPR including RPR Lite for meeting the above needs.

The present invention provides a data transmission apparatus used in a multiple service ring including at least two nodes coupled to at least one aggregate pipe and at least one tributary, said apparatus comprising: a tributary TX framer coupled to said tributaries for converting data received from said tributaries into XP (processing protocol) data packets; transmission setup means for setting-up information indicating the destination node address and destination tributary for XP packets to be transmitted; a TX framer for encapsulating said information indicating the destination node address and destination tributary and the XP packets into frames of the multiple service ring and transmitting the same along an aggregate pipe to a downstream neighbor node in the ring; a RX framer for receiving and deframing data frames of the multiple service ring from a upstream neighbor node along an aggregate pipe to obtain at least a destination node address and XP packets; transiting means for transiting the frames destined to other nodes to said TX framer so as to forward the frames destined to other nodes to a next node; a destination tributary determining means for determining a destination tributary of the XP packets for local node; and a tributary RX framer for converting said XP packets for local node from the RX framer into data of format of local tributary and sending the local tributary data to a corresponding tributary determined by said destination tributary determining means.

The present invention further provides a data transmission method used in a multiple service ring including at least two nodes coupled to at least one aggregate pipe and at least one tributary, said apparatus comprising: receiving data from a tributary and converting the received data into XP (processing protocol) data packets; setting-up information indicating the destination node address and destination tributary for XP packets to be transmitted; encapsulating said information indicating the destination node address and destination tributary and the XP packets into frames of the multiple service ring and transmitting the same along an aggregate pipe to a downstream neighbor node in the ring; receiving and deframing data frames of the multiple service ring from a upstream neighbor node along an aggregate pipe to obtain at least a destination node address and XP packets; transiting the frames destined to other nodes so as to forward the frames destined to other nodes to a next node; determining a destination tributary of the XP packets for local node; and converting said XP packets for local node into data of format of local tributary and sending the local tributary data to a corresponding tributary determined by said destination tributary determining step.

BRIEF DESCRIPTION OF THE DRAWINGS

FIG. 8 illustrates Expressions of 1+1 and 1:1 tributary protection parameters according to one embodiment of the invention.

FIG. 9 shows Expressions of 1:N tributary protection parameter according to one embodiment of the invention.

FIG. 10 shows Expressions of 1+1 and 1:1 tributary protection parameters according to one embodiment of the invention.

FIG. 11 shows Expressions of 1:N tributary protection parameter according to one embodiment of the invention.

DETAILED DESCRIPTION OF THE PREFERRED EMBODIMENTS

The keywords of the invention are given as follows: Tributary based 1+1, 1:1 and 1:N protection within 50 ms; Tributary based bandwidth management with symmetry and asymmetry, Tributary based multicast; Tributary based performance monitoring in the 15-minute and 24-hour, Tributary based security, RPR MAC Client, No Fairness arithmetic, Local Destination Address and Source address; Tributary Type (TT); Tributary Number (TN); Frame Sequence Number (FSN).

1 Scope

This Technology presents Multiple Services Ring based on RPR lite in the way of pre-plan and connection based on EEE 802.17 Lite. EEE 802.17 lite uses local addresses and the broadcast address in providing of tributary services and uses 802.17 frame format that allows This technology to use payload within Ethertype. Fairness A0 provisioned traffic (and subsequently no fairness) is all that is required to provide functions of this technology. This technology is only used in configurations where tributary service is managed such that over provisioning does not occur. Architecturally, single-ring, the link, broadcast and pseudo-mesh topologies are provided also. The service tributary interfaces of RPR lite node are used to provide Ethernet and various TDM Circuit Emulations. This technology provides tributary based 1+1, 1:1 and 1:N protection within 50 ms, and tributary based multicast, tributary bandwidth limitation with symmetry and asymmetry, tributary Merging, tributary Line-Speed Filtering of packet, tributary Mirroring, tributary performance monitoring in the 15-minute and 24-hour and is also used to provide forwarding of XP data link frame (also being a tributary) similar to functionality found in a more complex routing data system. This technology provides a packet-based transport model to multiple services and multiple topologies.

Figure 1:
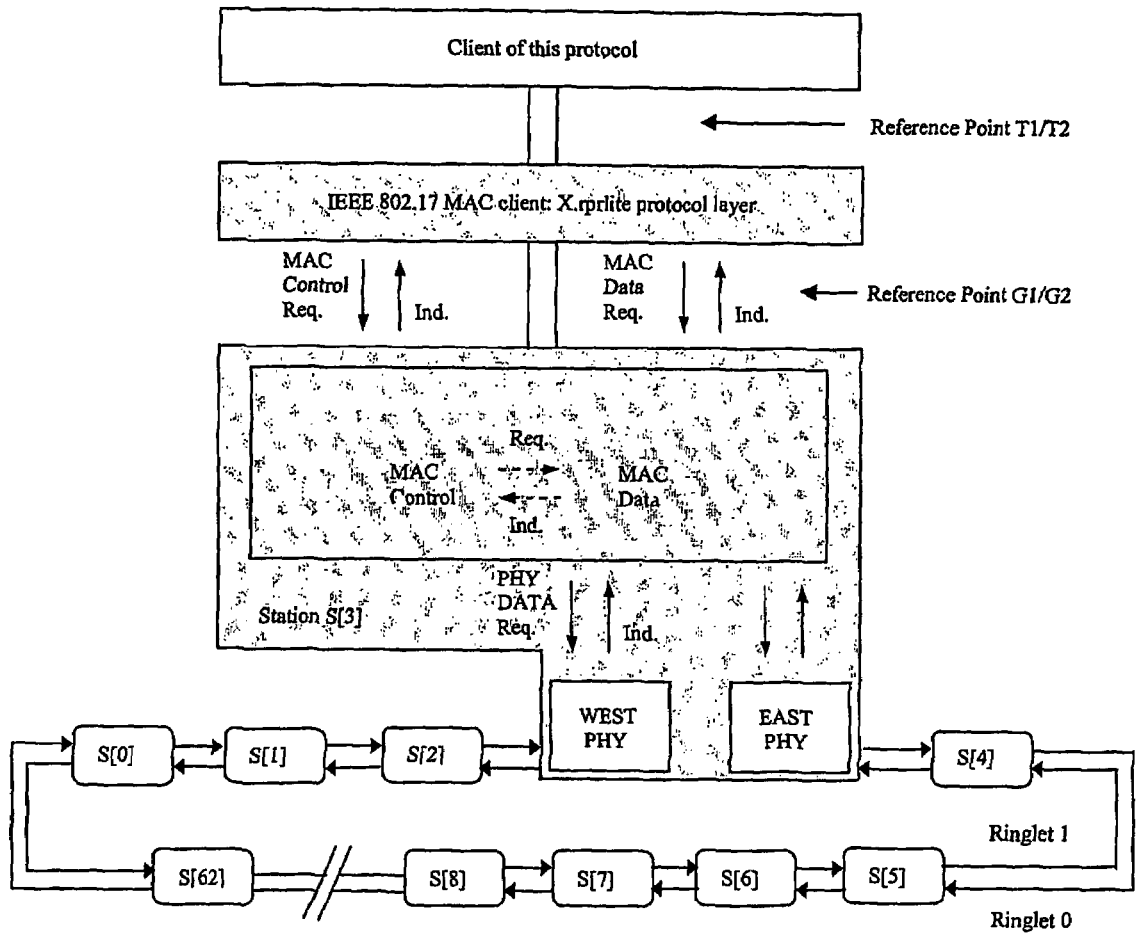
FIG. 1 shows MAC Architecture of IEEE 802.17 Lite based on MSR

FIG. 1 Shows MAC Architecture of IEEE 802.17 Lite Based on MSR

This Technology is based on RPR lite and is only used in configurations and pre-plan where topology and protection is provisioned only. IEEE 802.17 lite will only use the provisioned topologies and protections. The data frame, control frame and network management frame in the Technology is all required to map to the payload of RPR data frame. All of these frames described in the Technology has no relations to and is independent on the control frames (just like frames of topology discovery, fairness, protection) of RPR MAC layer. No change is made for all Ethernet-based protocols (including IEEE 802.3 Ethernet), all PDH standards, Frame Relay standards, G.702/ISDN standards and ETSI DVB specifications. This technology is located at a dual-directional symmetric counter-rotating rings based on IEEE802.17 lite.

2 References

The following ITU-T Recommendation, and other references contain provisions which, through reference in this text, constitute provisions of this Technology. At the time of publication, the editions indicated were valid. All Recommendations and other references are subject to revision: all users of this Technology are therefore encouraged to investigate the possibility of applying the most recent edition of the Recommendations and other references listed below. A list of currently valid ITU-T Recommendations is regularly published.

[1] ITU-T Recommendation X.85/Y.1321, IP over SDH using LAPS.

[2] ITU-T Recommendation X.86/Y.1323, Ethernet over LAPS.

[3] ITU-T Recommendation X.211 (1995)|ISO/IEC 10022 (1996), Information technology—Open Systems Interconnection—Physical service definition.

[4] ITU-T Recommendation X.212 (1995)|ISO/IEC 8886 (1996), Information technology—Open Systems Interconnection—Data link service definition.

[5] ITU-T Recommendation X.200 (1994)|ISO/IEC 7498-1 (1994), Information technology—Open System Interconnection—Basic reference model: The basic model.

[6] ITU-T Recommendation I.363.1 (1996), B-ISDN ATM Adaptation Layer specification: Type 1 AAL

[7] IEEE Draft P802.17/D1.1, Resilient Packet Ring Access Method & Physical Layer Specifications—Media Access Control (MAC) Parameters, Physical Layer Interface, and Management Parameters, October, 2002 Edition.

3 Definitions

For the purposes of this Technology, the following definitions apply:

3.1 Aggregate Pipe: a physical connection of two adjacent nodes. Aggregate pipe is a channel of RPR Lite based on a span of RPR lite.

3.2 Control Signalling Frame: a frame used to tributary connection establishment, topology discovery, Layer 2 protection switching of manual switch or forced switch etc in a node.

3.3 CT_Request Frame: a frame used to send a configuration table request from Node A to Node B along a RPR ring.

3.4 CT_Response Frame: a frame used to send a configuration table response from Node B to Node A along a RPR ring.

3.5 Configuration Table (CT): a mapping table reflecting the actual value of TT and TN in a node and TCCR between nodes on the RPR ring during engineering operation or project installation phase.

3.6 Configuration Table Inquiry (CTI): a function to get CT from a node. CT_Request frame with a CTI parameter reflecting changing part of TCCR of a node on RPR ring is sent to other nodes (called one of them as Node B) by unicast/multicast/broadcast mode from a node (called Node A, e.g. Central station in the most case) by network management interface during normal engineering operation or project installation phase. All nodes received CT_Request frame with a CTI parameter will give a point-to-point response by CT_Response frame with a CTI parameter reflecting actual configuration table of the local node on RPR ring to Node A.

3.7 Configuration Updating Table (CUT): a mapping table reflecting the available value modification of TT and TN in a node and TCCR between nodes on the RPR ring during engineering operation or project installation phase. The incorrect ICT will lead to fault of Tributary on RPR ring. CT_Request frame with an CUT parameter reflecting changed part of TCCR of all node on RPR ring is sent to other nodes by broadcast mode from a node (e.g. Central station in the most case) by network management interface during normal engineering operation or project installation phase. All nodes received CT_Request frame will build corresponding mapping relations of TCCR in the local node and give a point-to-point response by CT_Response frame to that node sending CT_Request frame. After getting CT-Response frame, that node sourcing CT_Request frame issues a CT_Confirm frame to that remote node sending CT_Response frame.

3.8 Frame Sequence Number (FSN): A modulo used to performance monitoring based on Tributary service. This 8-bit field is used to identify Frame Sequence Number (FSN) of Ethernet or TCE data frames or IP related L3 forwarding packets in numbered modulo N_fsn=64 (default value, N_fsn is programmable and can be configured to 256 if application needs) from 0 to 63. The field is used to performance monitoring function for packet lost or duplicated of TCE based tributary. The FSN field will be set to zero if the signalling control frames or network management frames are used.

3.9 Initial Configuration Table (ICT): a mapping table reflecting the initial and available value of TT and TN in a node and TCCR between nodes on the RPR ring during engineering installation or project installation phase. The ICT must be pre-installed before RPR engineering operation or project installation phase. The incorrect ICT will lead to fault of Tributary services on RPR ring. CT_Request frame with an ICT parameter reflecting initial TCCR of all nodes on RPR ring is sent to other nodes by broadcast mode from a node (e.g. Central station in the most case) by network management interface during initial engineering operation or project installation phase. All nodes received CT_Request frame will build corresponding mapping relations of TCCR in the local node and give a point-to-point response by CT_Response frame to that node sending CT_Request frame. After getting CT-Response frame, that node sourcing CT_Request frame issues a CT_Confirm frame to that remote node sending CT_Response frame.

3.10 Layer 3 Forwarding Packet: a packet used to forward data packet in a node. This packet is different from those packets of reaching a Tributary in a node, is also different from network management frames and control signalling frames. Logically, a node can be treated as a router of performing Layer 3 forwarding when a Layer 3 forwarding Packet is forwarded according to routing table and routing protocols of Ipv4/6 in a node from the node to other node along the RPR.

3.11 Multiple Services Ring (MSR): a bi-directional symmetric counter-rotating fibre rings based on RPR lite and located at RPR MAC client (refer to FIG. 1), each node could add and drop one or more independent tributaries.

3.12 Resilient Packet Ring (RPR): a high-speed network technology optimised for frame transmission over a redundant ring topology.

3.13 Resilient Packet Ring Lite (RPR Lite): a special case of RPR, which uses only class A0 traffic (and subsequently no fairness), provisioned topology and protection, IEEE 802.17 frame format, tributary service based operation.

3.14 RPR Rx Framer: a RPR MAC framer in Rx side, it terminates a frame of IEEE 802.17 through a station via the ringlet.

3.15 RPR Tx Framer: a RPR MAC framer in Tx side, it passes a frame of IEEE 802.17 through a station via the ringlet.

3.16 XP Data Node: a RPR Lite Node that has an eastward Rx, an eastward Tx, a westward Rx and a westward Tx Aggregate Pipe connections along RPR ring, and one or more adding and dropping independent tributaries. It also has functions of receiving, transmitting and forwarding of network management frame, control signalling and data frame in a Node. The different connection configuration is applied for the different topologies.

3.17 Processing Protocol (XP): a data link protocol between RPR MAC framer and Tributary framer, used to communication between different nodes over a RPR lite. The XP does operate by sending/receiving both data frame and the associated network management/signalling frames to/from a RPR MAC of a node.

3.18 XP Rx Processor: a set of functions used to XP processing in Rx direction. It includes Rx entity after RPR MAC, discrimination of multicast/broadcast, TT/TN value and other associated XP protocol processing.

3.19 XP Tx Processor: a set of functions used to XP processing in Tx direction. It includes Tx entity outgoing to RPR MAC, Tx schedule unit, functions of determination of NA, TTL, TT, TN, FCS, multicast/broadcast. The other associated XP protocol processing is also included.

3.20 N_ct: a count of retransmission used to Configuration Table Operation. All nodes on a ring will wait to be assigned ICT during engineering installation phase. After issuing CT_Request frame, Node A will automatically send CT_Request frame again after retransmit Timer_ct (it is programmable) if Node A does not receive corresponding CT_Response frame. It is believed that Node B is not reachable after N times of retransmission (N_ct is programmable also). N_ct is also used by CUT operation.

3.21 Network Management Frame: a frame used to performance and fault monitoring, node configuration management etc along a RPR ring or other different topologies.

3.22 Node Address (NA): an address that identifies a particular station on a network. NA is a local address and has local meaning only along the RPR ring or other different topologies. IEEE assigns value of 24 bits, manufacturer assigns remaining 22—local indicates a locally administered address. It is the responsibility of the administrator to insure uniqueness.

3.23 Reference Point G1: a reference point between RPR MAC Rx Framer and Tributary Multicast/Broadcast Unit. It stands for processing sink of RPR MAC framer in RPR MAC client side.

3.24 Reference Point G2: a reference point between RPR MAC Tx Framer and TX Schedule. It stands for processing source of RPR MAC framer in RPR. MAC client side.

3.25 Reference Point T1: a reference point between Tributary Rx Framer and XP processor. It stands for processing sink of XP before Tributary Rx framer of TCE or Ethernet etc.

3.26 Reference Point T2: a reference point between Tributary Tx Framer and XP processor. It stands for processing source of XP after Tributary Tx framer of TCE or Ethernet etc.

3.27 Source Tributary (ST): a Tributary used as multicast/broadcast source in a membership group within a node.

3.28 Timer_ct: a Timer of retransmission used to Configuration Table Operation. All nodes on a ring will wait to be assigned ICT during engineering installation or project installation phase. After issuing CT_Request frame, Node A will automatically send CT_Request frame again after retransmission Timer_ct (it is programmable) if Node A does not receive corresponding CT_Response frame. It is believed that Node B is not reachable after N_ct times of retransmission (N_ct is programmable also). N_ct is also used by CUT operation.

3.29 Transit: a passing of a frame through a station via the ringlet.

3.30 Tributary: an independent adding/dropping tributary (or service) channel to/from a data nodes, just like a series "Private Line or Private Circuit for Renting from Carrier". Tributary can be multi-service with a constant bandwidth of symmetry and asymmetry. The different tributary can be assigned to different priority.

3.31 Tributary Adaptation Function Unit: an adaptation function from/to various independent tributary type signals to/from reference point T1/T2. It has Tributary Adaptation Source Function and Tributary Adaptation Sink Function. A Sink corresponds to reference point T1, a source to reference point T2. This adaptation function can include the signal and rate transform, synchronous function between two sides of peer to peer.

3.32 Tributary Cross-connection Relationship (TCCR): a table reflecting Tributary cross-connection relationship of all nodes on a ring or other topologies. It is global table of RPR or other topologies, that is, source and sink connection relationship of all available tributaries.

3.33 Tributary Membership Copy: a duplicate function implementation from Source Tributary (ST) to every Tributary in the corresponding membership group within a node.

3.34 Tributary Multicast/Broadcast: a discriminator of distinguishing unicast or Multicast/Broadcast packets while a packet is coming up from a RPR Rx Framer via the ringlet, so as to provide TBM function. The TBM Function Unit built in a Node is used to provide one or more independent hierarch of multicast possibly involved the same or different TT at the same time. TBM Function Unit implements a duplication function within a node (station) from a Tributary getting a payload of a frame from the related topologies to other multiple Tributary with the same TT value and with being set to have a relation of membership group. A group of TN with the same TT value within a Node can be set to become a membership group of multicast/broadcast. It is required that a designated Tributary in the membership group should receive data frames at the reference point G1 from the related topologies. This Technology uses this designated Tributary as a Source Tributary (ST). Once getting data frames, the ST duplicates those frames to every Tributary in the corresponding membership group within a node. The ST should be set and designated to a given value of TT and TN by network management entity during the project installation phase or on-line operation phase. The one or more STs can be designated or changed dynamically within a node according to the customer requirements.

3.35 Tributary Rx Framer: an abstract of physical framer of Tributary at Rx side, it stands for a framer of TCE or Ethernet framer.

3.36 Tributary Tx Framer: an abstract of physical framer of Tributary at Tx side from a viewpoint of ringlet, it stands for a framer of TCE or Ethernet framer.

3.37 Tributary Number (TN): a number of same types of Tributary Port on a node from a viewpoint of ringlet. This number is 7 if the 7th ISDN is provided in a node.

3.38 Tributary Type (TT): a type of an independent adding/dropping tributary channel to/from the RPR data nodes. This type can be TCE service.

3.39 Tx Schedule: a control function for transmitted frame in a node according to the priority level of (a) forwarded frames from upstream node, (b) multicast/broadcast frames and (c) transmitted frame from the local station. If there are several frames to be sent in a node at the same time, the schedule unit will check priority of frame and decide which frame will go first to the downstream along the ringlet.

3.40 XP Rx Processor: a set of logical functions (of RPR MAC client) used to XP processing in Rx direction. It includes Rx entity after RPR MAC, discrimination of multicast/broadcast based on Tributary, TT/TN value, FSN value, CS&NM value and other associated XP protocol processing.

3.41 XP Tx Processor: a set of logical functions (of RPR MAC client) used to XP processing in Tx direction. It includes Tx entity outgoing to RPR MAC, Tx schedule unit, functions of determination of NA, TTL, TT, TN and FSN, multicast/broadcast from the view of RPR MAC layer. The other associated XP protocol processing is also included.

4 Abbreviations 4.1 Abbreviations Specified in IEEE 802.17
This Technology makes use of the following abbreviations specified in IEEE 802.17:
DA destination address
FCS frame check sequence
HEC header error check
IEEE Institute of Electrical and Electronics Engineers
LAN local area network
MAC medium access control
MAN metropolitan area network
MIB management information base
MTU maximum transfer unit
PDU protocol data unit
PHY physical layer
POS packet over SONET
RI Ringlet Identifier
SA source address
SDU service data unit
SNMP simple network management protocol
SPI system packet interface
TTL time-to-live
WAN wide area network
WTR wait to restore 4.2 Abbreviations Specified in ITU-T I.321 and I.361
This Technology makes use of the following abbreviations specified in ITU-T Recommendation:
a) ATM Asynchronous Transfer Mode 4.3 Abbreviations Specified in ETSI
This Technology makes use of the following abbreviations specified in ETSI Recommendation EN 300 429:
a) DVB Digital Video Broadcast 4.4 Abbreviations Used in this Technology
1) CS&NM Control Signalling and Network Management
2) CT Configuration Table
3) CTI Configuration Table Inquiry
4) CUT Configuration Updating Table
5) ETBP Ethernet Tributary Based Protection
6) GMII Gigabit Ethernet Media Independent Interface
7) ICT Initial Configuration Table
8) LSFFU Line-Speed Filtering Function Unit
9) MAC Media Access Control
10) MDL Layer Management of Data Link
11) NA Node Address of Resilient Packet Ring
12) RPR Resilient Packet Ring
13) RPR Lite Resilient Packet Ring Lite
14) Rx Receive data
15) ST Source Tributary
16) TBM Tributary Based Multicast
17) TBP Tributary Based Protection
18) TCCR Tributary Cross-Connection Relationship
19) TCE TDM Circuit Emulation
20) TDM Time Division Multiplex
21) TMG Tributary Merging Group
22) TTBP TCE Tributary Based Protection 23) TN Tributary Number
24) TT Tributary Type
25) XGMII 10G Ethernet Media Independent Interface
26) XP Processing Protocol
27) XP-PDU XP—Protocol Data Unit
28) XP-SAP XP—Service Access Point
29) XP-SDU XP—Service Data Unit
30) Tx Transmission data
30) CAM Content Address Memory 5 Network Framework of Multiple Services Ring Based on RPR Lite 5.1 Elements of Ring Over RPR MAC MSR based on RPR Lite employs a dual-ring structure consisting of a pair of unidirectional count-rotating ringlets, more than one nodes of each with RPR MAC, RPR MAC Client and at least one Tributary. RPR lite uses local node addresses and the multicast address in providing of tributary services and uses RPR frame format that allows this technology to use payload within Ethertype. Fairness A0 provisioned traffic (and subsequently no fairness) is all that is required to provide this technology. This technology is only used in configurations where tributary service is managed such that over provisioning does not occur. Architecturally, single-ring, the link, broadcast and pseudo-mesh topologies are provided also. Each node could add and drop one or more independent tributary (e.g. DVB port, also could transmit and receive layer 3 (Ipv4/Ipv6 packet) forwarding data packet (also being a tributary), control signalling frame and network management frame. This technology provides multicast and broadcast of these Tributary service and forwarding data packet.

5.2 Frame Types on a Ring and Multiple Service in Tributary

Each node has ability of adding and dropping one or more independent Tributary services used in Table 1.

TABLE 1

Types of multi-service in Tributary

| Tributary types | Capabilities | | |
|---|---|---|---|
| TCEs | Full duplex point-to-point | Multicast | Broadcast |
| Ethernet | Full duplex point-to-point | Multicast | Broadcast |

Note 1:
The bandwidth of aggregate pipe depends on deployment service requirements, the aggregate Tributary bandwidth be half the aggregate pipe bandwidth to provide protection bandwidth availability where needed. Where services requirements allow the aggregate of Tributary bandwidth can exceed the aggregate bandwidth.
Note 2:
Multicast is half duplex point-to-multipoint of node based, Broadcast is half duplex point of node based to all other points on a ring.

Transmitted and received frames on a ring have (1) frames of multi-service station by station, (2) layer 3 (Ipv4/Ipv6 packet) forwarding data packet (just like router), (3) control signalling frame and (4) network management frame described in Table 2, to show full capabilities of point-to-point, multicast and broadcast along a ring.

TABLE 2

Frame types

| Frame types | Capabilities | | |
|---|---|---|---|
| Frames of multi-service station by station | Point-to-point | Multicast | Broadcast |

TABLE 2-continued

Frame types

| Frame types | Capabilities | | |
|---|---|---|---|
| Layer 3 (Ipv4/Ipv6 packet) forwarding data packet (a node operates just like a router) | Point-to-point | Multicast | Broadcast |
| Control Signalling Frame | Point-to-point | Multicast | Broadcast |
| Network Management Frame | Point-to-point | Multicast | Broadcast |

Figure 2:
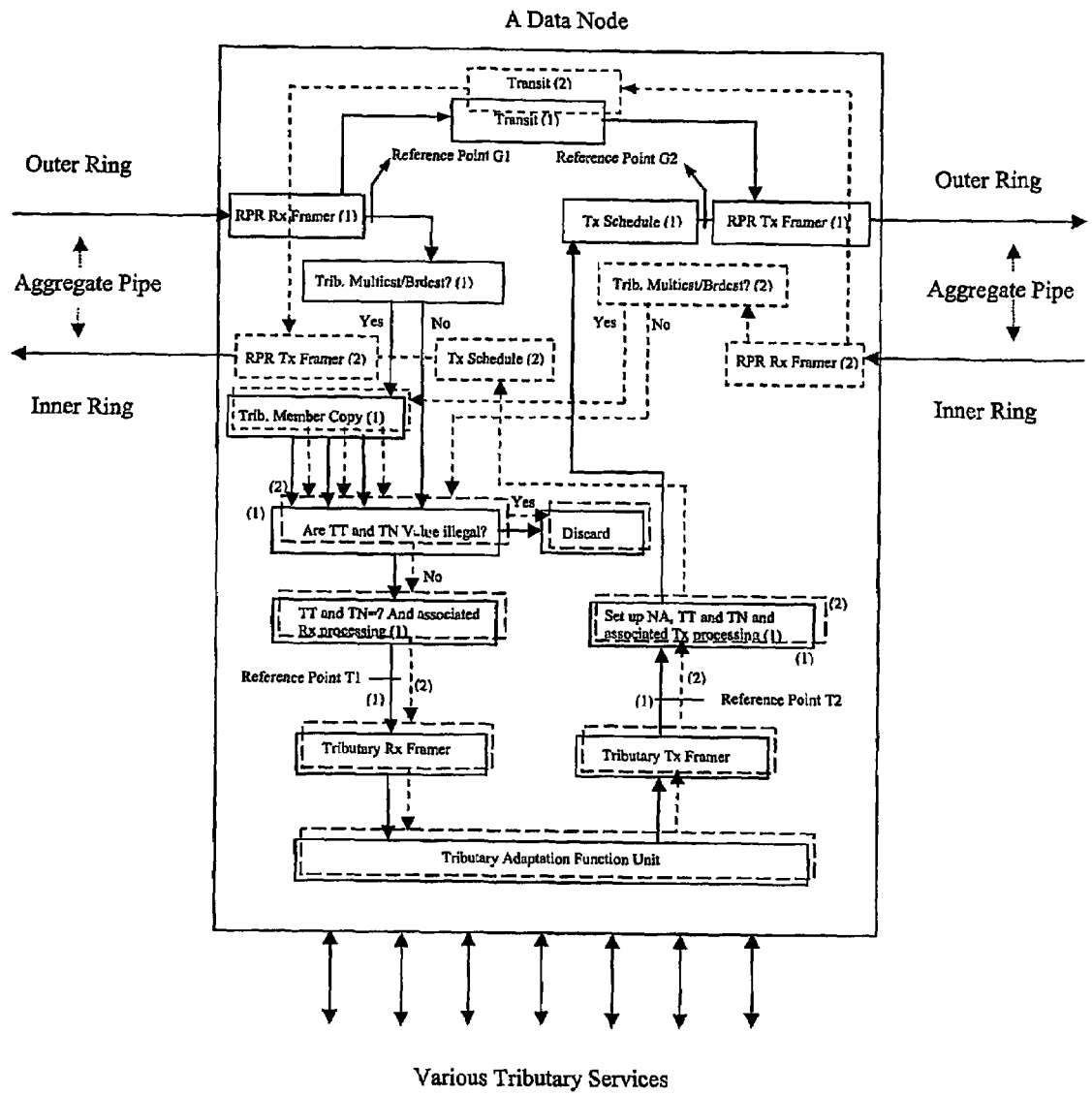
FIG. 2 illustrates Tx and Rx diagram of a data node according to one embodiment of the invention.

FIG. 2 illustrates Tx and Rx diagram of a data node according to one embodiment of the invention.

5.3 Components of a Data Node in MAC Client

A RPR data node is the system equipment that has an eastward Rx, eastward Tx, westward Rx and westward Tx Aggregate Pipe connections, and one or more adding and dropping independent Tributaries over RPR MAC. A node also has functions of receiving, transmitting and forwarding of network management frame, control signalling and data frame in a Node. The corresponding change should be made as the different connection configuration is applied for the different topologies. The basic components of a node are as follows.

5.3.1 Aggregate Pipe: a physical connection of two adjacent RPR nodes.

5.3.2 Tributary: an independent adding/dropping tributary channel to/from the RPR data nodes, just like a series "Private Line or Private Circuit for Renting from Carrier". Tributary can be a G.702 ports. The different tributary can be assigned to different priority.

5.3.3 Inner Ring: a inner single ring of RPR.

5.3.4 Outer Ring: a outer single ring of RPR.

5.3.5 MAC Client: The layer entity of XP that invokes the MAC service interface.

5.3.6 Transit: a passing of a frame through a station via the ringlet.

5.3.7 Schedule Unit: a control function for transmitted frame in a node according to the priority level of forwarded frames from upstream station, multicast/broadcast frames and transmitted frame from the local station. If there are several frames to be sent in a node at the same time, the schedule unit will decide which frame will go first to the downstream along the ring.

5.3. RPR Rx Framer: a RPR MAC framer in Rx side, it terminates a frame of IEEE 802.17 through a station via the ringlet.

5.3.9 RPR Tx Framer: a RPR MAC framer in Tx side, it terminates a frame of IEEE 802.17 through a station via the ringlet.

5.3.10 Tributary Rx Framer: an abstract of physical framer of Tributary at Rx side, it stands for a framer of TCE or Ethernet framer.

5.3.11 Tributary Tx Framer: an abstract of physical framer of Tributary at Tx side, it stands for a framer of TCE or Ethernet framer.

3.3.12 XP Rx Processor: a set of logical functions (of RPR MAC client) used to XP processing in Rx direction. It includes Rx entity after RPR MAC, discrimination of multicast/broadcast based on tributary, TT/TN value, FSN value, CS&NM value and other associated XP protocol processing.

3.3.13 XP Tx Processor: a set of logical functions (of RPR MAC client) used to XP processing in Tx direction. It includes Tx entity outgoing to RPR MAC, Tx schedule unit, functions of determination of NA, TTL, TT, TN and FSN, multicast/broadcast from the view of RPR MAC layer. The other associated XP protocol processing is also included.

5.4 Reference Point in MAC Client of a Data Node

The four different Reference Points are used in a node.

5.4.1 Reference Point G1: a reference point between RPR MAC Rx Framer and Tributary Multicast/Broadcast Unit. It stands for processing sink of RPR MAC framer in RPR MAC client side.

5.4.2 Reference Point G2: a reference point between RPR MAC Tx Framer and TX Schedule. It stands for processing source of RPR MAC framer in RPR MAC client side.

5.4.3 Reference Point T1: a reference point between Tributary Rx Framer and XP processor. It stands for processing sink of XP before Tributary Rx framer of TCE or Ethernet etc.

5.4.4 Reference Point T2: a reference point between Tributary Tx Framer and XP processor. It stands for processing source of XP after Tributary Tx framer of TCE or Ethernet etc.

5.5 Operation of Layer 3 Forwarding Packets Over MAC Client

A data node can be used as a router to forward IP related packets to other nodes on RPR ring according to relationship between Ipv4/Ipv6 routing table and its NA/TT/TN while this node could provide Tributary port for renting just like private line or circuit. When a data node is taken a role of router, the control plane (e.g. operation of routing protocols), network management plane (e.g. Simple Network Management Protocol) and data plane of a router (RPR data node) will share the same physical channel corresponding to the value of NA, TT and TN along the ring. The data frame, control frame and network management frame in this Technology is all required to map to the payload of RPR data frame. All of these frames described in this Technology has no relations to and is independent on the control frames (just like frames of topology discovery, fairness, protection) of RPR MAC layer.

5.6 Operation of Network Management Frames in MAC Client 5.6.1 Initial Configuration Table (ICT) Operation ICT is a mapping table reflecting the initial and available value of TT and TN in a node and TCCR between nodes along a ringlet during engineering installation. The ICT must be pre-installed before RPR engineering operation. The incorrect ICT will lead to fault of Tributary services on a ring. CT_Request frame with an ICT parameter reflecting initial TCCR of all nodes on a ring is sent to other nodes by broadcast mode from a node (called Node A, e.g. Central station in the most case) by network management interface during initial engineering operation period. All nodes (called Node B) received CT_Request frame will build corresponding mapping relations of TCCR in the local node and give a point-to-point response by CT_Response frame to Node A.

All nodes on a ring will wait to be assigned ICT during engineering installation period. After issuing CT_Request frame, Node A will automatically send CT_Request frame again after retransmit timer (it is programmable, named for Timer_ct) if Node A does not receive corresponding CT_Response frame. It is believed that Node B is not reachable after N_ct times of retransmission (N_ct is programmable also).

If Node A has received a message of CT_Response frame with a Null parameter from Node B either before CT retransmit expired or before N_ct times of retransmission, it is believed that ICT operation for Node B is successful.

5.6.2 Configuration Updating Table (CUT) Operation

CUT is a mapping table reflecting the available value modification of TT and TN in a node and TCCR between nodes on the RPR ring during an on-line operation. The incorrect CUT will lead to fault of Tributary on RPR ring. CT_Request frame with a CUT parameter reflecting changed part of TCCR of all nodes on RPR ring is sent to other nodes (called one of them Node B) by broadcast mode from a node (called Node A, e.g. Central station in the most case) by network management interface during normal engineering operation period. All nodes received CT_Request frame will build corresponding mapping relations of TCCR in the local node and give a point-to-point response by CT_Response frame to Node A.

After issuing CT_Request frame, Node A will automatically send CT_Request frame again after retransmit timer (it is programmable, named for Timer_ct) if Node A does not receive corresponding CT_Response frame. It is believed that Node B is not reachable after N_ct times of retransmission (N_ct is programmable also).

If Node A has received a message of CT_Response frame with a Null parameter from Node B either before retransmitted CT expired or before N_ct times of retransmission, it is believed that CUT operation for Node B is successful.

5.6.3 Configuration Table Inquiry (CTI) Operation

CT_Request frame with a Null parameter is sent to other nodes (called one of them Node B) by unicast/multicast/broadcast mode from a node (called Node A, e.g. Central station in the most case) by network management interface during normal engineering operation period. All nodes received CT_Request frame with a Null parameter will send a point-to-point response by CT_Response frame with a CTI parameter reflecting actual configuration table of the local node on a ring to Node A.

5.7 Fault Management in MAC Client

If a fault occurs, Fault_Report frame with a fault parameter used in 9.6 is sent to designated node (connected to network management interface). The network management entity can pass Fault_Request Frame with a fault parameter used in 9.6 from designated node to a targeted node. The targeted node issues Fault_Response Frame with a fault parameter used in 9.6 to designated node as a responding.

5.8 Performance Management in MAC Client

Once 15 minutes or 24 hours expired, each node in a ring will issue Performance_Report frame with a performance parameter used in 9.6 to designated node (connected to network management interface). The network management entity can pass Performance_Request Frame with a performance parameter used in 9.6 from designated node to a targeted node if needed anytime. The targeted node responds by Performance_Response Frame with a performance parameter used in 9.6 to designated node.

6 The Protocol Framework of MSR Based on RPR Lite

6.1 The protocol Framework of GE and 10GE Based Aggregate Pipe

Figure 3:
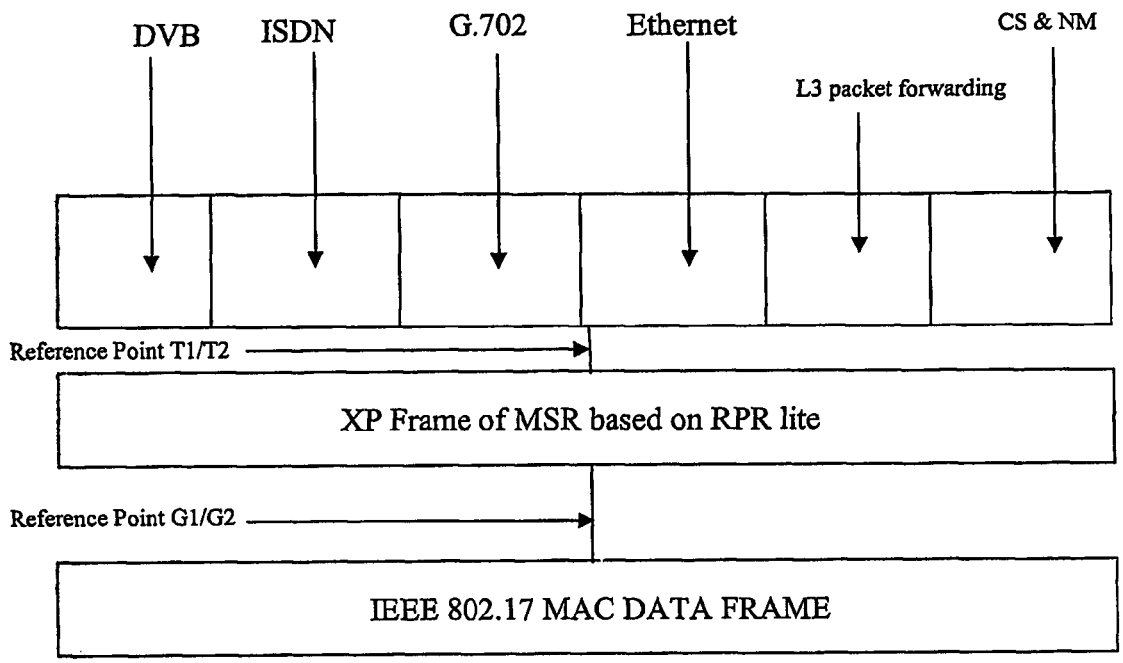
FIG. 3 illustrates generic Protocol Stack of MSR Based on RPR Lite according to one embodiment of the invention.

The protocol framework of XP is shown as FIG. 3. This Technology treats XP as an upper layer protocol of 802.17 MAC of point-to-point full-duplex mode. The use of control signals is not required. The self-synchronous scrambling/descrambling function is not applied in XP layer during insertion/extraction into/from the MAC payload of RPR. Communication service facilities between XP and RPR MAC layer are accomplished by means of primitives (MAC-DATA request and MAC-DATA indication shown in FIG. 4) with parameters of Ring Control Field, Destination Address (It is local), Source Address (It is local), Protocol Type filed, topology status, TT, TN, CS&NM value, FSN and payload or parameters of XP layer according to the principle of ITU-T Recommendation X.211. Specification of Primitives specifies the interaction between XP and MAC layer to invoke and provide a service, and presents the elements of primitives.

XP located at RPR MAC client is the data link protocol also, which provides point-to-point transferring over RPR MAC frame. The establishment and disconnection of tributary service are accomplished by the associated control signalling (just like Soft Permanent Virtual Circuit) or network management frames. Communications between data link and the associated upper protocols are accomplished by means of primitives according to the principle of ITU-T Recommendation X.212.

The service facility of XP provided to its upper protocols via SAP (Service Access Point) is the XP-UNACK-DATA request primitive with "User data" (data frame in Tributary and L3 forwarding portion or frame of CS & NM) and "Priority" parameter set in a node, and the XP-UNACK-DATA indication primitive with "User data" (data frame in Tributary and L3 forwarding part or frame of CS & NM) and "Priority" parameter from received frame. "User data" is the outgoing/incoming upper layer packet. The default maximum frame size of XP shall be within the scope of 1600 octets after taking into account the overhead of XP frame. Providing the maximum frame size of Ipv6 jumbo payload needs to align with IEEE 802.17. The octet stuffing procedure will not be used in this case.

An invalid frame is a frame which:
a) Has fewer than six octets (includes TT, TN, CS&NM, FSN fields) within the RPR MAC payload; or
b) Contains a TT or TN that is mismatched or not provided by the receiver.

Invalid frame shall be discarded without notification to the sender. But for the lost or duplicated frames of a tributary (including L3 forwarding packets), the results of performance monitoring should be reported to layer management entity of RPR MAC client and be operated according to 9.6.

The connection management entity is used to monitor the XP link status of receiving the peer link frame. It is local matter only and has not any associated frame to be used between the two sides.

After initialization (the defaults of T200 and N200 are set to 10 milliseconds and 3 respectively), the XP entity enters the normal way of transmitter and receiver.

If the timer T200 expires before any frame (including MAC data & control frames and Inter-Frame Gap of RPR) is received at the reference point G1, the XP entity shall restart timer T200 and decrement the retransmission counter N200.

If timer T200 expires and retransmission counter N200 has been decremented to zero before any frame is received at the reference point G1, the XP entity shall (a) indicate this to the local connection management entity by means of the MDL-ERROR indication primitive, (b) indicate a notification to the local ETBP/TTBP Function Unit within the node by means of the EVENT_Report primitive with the TT and TN parameters, and (c) restart timer T200 and recover the value of N200.

The value of T200 and N200 shall be configurable. The minimum unit configured of T200 and N200 is 5 milliseconds and 1 respectively.

Protocol stack of IP over 802.17 MAC using XP will be used to Layer 3 forwarding packets. The reference point G1/G2 and T1/T2 is reflected in and is corresponded to FIG. 2 and section 5.4 also.

FIG. 3 illustrates generic Protocol Stack of MSR Based on RPR Lite according to the invention.

Figure 4:
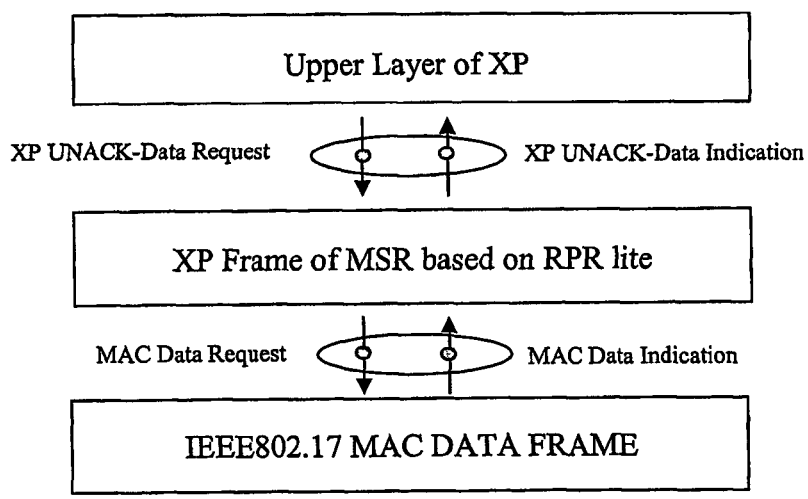
FIG. 4 illustrates Relationship between XP and RPR MAC, Upper Layer and XP according to one embodiment of the invention.

FIG. 4 illustrates Relationship between XP, and RPR MAC, Upper Layer and XP according to the invention.

6.2 Tributary Adaptation Function Unit

Tributary Adaptation Function Unit is an adaptation function from/to various independent tributary type signals to/from reference point T1/T2. It has Tributary Adaptation Source Function and Sink Function. The Sink corresponds to reference point T1, The Source to reference point T2. This adaptation function includes the signal and rate transform, synchronous function between Tributary Rx/Tx Framer and tributary service interface.

7 Generic Frame Format

Figure 5:
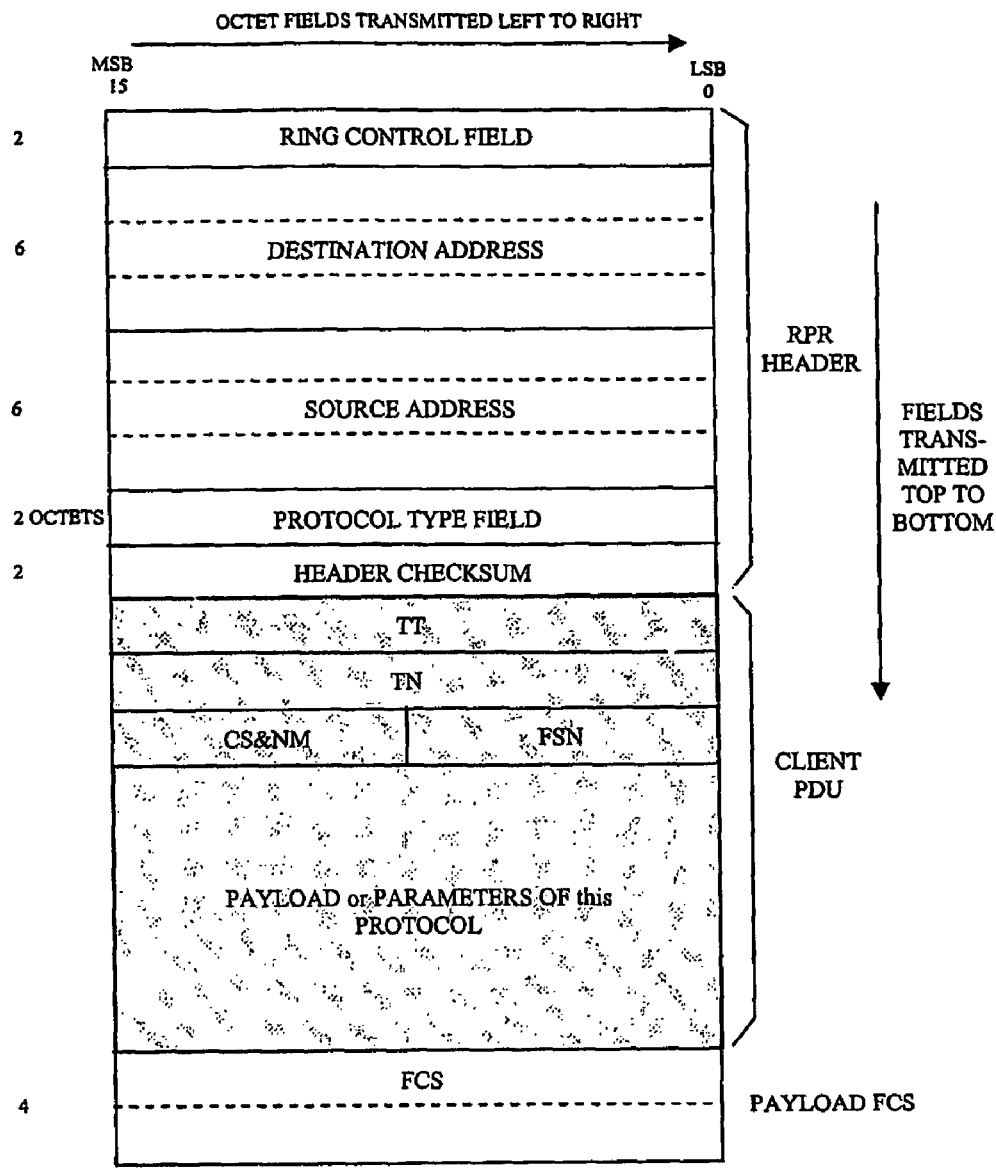
FIG. 5 shows the Generic Frame Format according to one embodiment of the invention.

Each XP frame uses a fixed sized header. The generic frame format is shown in FIG. 5. All binary fields in the following descriptions are transmitted in Most Significant Bit (MSB) to Least Significant Bit (LSB) order, from top to bottom. The definitions of Ring Control Field, Destination Address, Source Address, Protocol Type Field, Header Checksum and FCS Field have been specified in IEEE 802.17 RPR. This section will focus on the TT, TN, CS&NM, FSN field. For the specific application of this Technology, FE (Fairness Eligible) field is set to "0", PT (Payload Type) field is set to "3", Protocol type field is a fixed value ("4188H", for example).

FIG. 5 shows the Generic Frame Format according to the invention.

7.1 Destination Address for use of this Technology

This 48-bit field is different from the global an address that identifies a particular station on a network. NA is a local address and has local meaning only along the RPR lite ringlet or other different topologies. IEEE assigns value of 24 bits, manufacturer assigns remaining 22—local indicates a locally administered address. It is the responsibility of the administrator to insure uniqueness.

7.2 Tributary Type (TT) Field

This 16-bit field stands for a type of an independent adding/dropping tributary channel to/from the RPR (or other topologies) data nodes, Layer 3 forwarding packet, Control Signalling and Network management frame. Tributary channel can be Ethernet or various TCEs. Its codes are as follows (see Table 3).

TABLE 3

TT Codes

| Tributary types | Code |
| --- | --- |
| Reserved | 00000000–00001000 |
| G.702 PDH circuit - Synchronous circuit transport | 00001001 |
| G.702 PDH circuit - Asynchronous circuit 1.544 Mbit/s | 00001010 |
| G.702 PDH circuit - Asynchronous circuit 2.048 Mbit/s | 00001011 |
| G.702 PDH circuit - Asynchronous circuit 6.312 Mbit/s | 00001100 |
| G.702 PDH circuit - Asynchronous circuit 8.448 Mbit/s | 00001101 |
| G.702 PDH circuit - Asynchronous circuit 34.368 Mbit/s | 00001110 |
| G.702 PDH circuit - Asynchronous circuit 44.736 Mbit/s | 00001111 |
| G.702 PDH circuit - Synchronous circuit 1.544 Mbit/s | 00010000 |
| G.702 PDH circuit - Synchronous circuit 2.048 Mbit/s | 00010001 |
| G.702 PDH circuit - Synchronous circuit 6.312 Mbit/s | 00010010 |
| G.702 PDH circuit - Synchronous circuit 8.448 Mbit/s | 00010011 |
| G.702 PDH circuit - Synchronous circuit 34.368 Mbit/s | 00010100 |
| G.702 PDH circuit - Synchronous circuit 44.736 Mbit/s | 00010101 |
| Reserved for other PDH or DSL specification | 00010110–00010111 |

TABLE 3-continued

TT Codes

| Tributary types | Code |
| --- | --- |
| Video signal - Distributive television services | 00011000 |
| Video signal - Conversational services of bit rates higher than primary rates | 00011001 |
| Video signal - Conversational services of p × 64 kbit/s signals | 00011010 |
| Reserved for other Video signals | 00011011-00011111 |
| Voiceband signal - 64 kbit/s A-law coded Recommendation G.711 signals | 00100000 |
| Voiceband signal - 64 kbit/s μ-law coded Recommendation G.711 signals | 00100001 |
| Reserved for other Voiceband signals | 00100010-100111 |
| Digital channel supported by 64 kbit/s-based ISDN - Transport of 64 kbit/s channel | 00101000 |
| Digital channel supported by 64 kbit/s-based ISDN - Transport of 384, 1536 or 1920 kbit/s channel | 00101001 |
| Reserved for other TCEs | 00101010-00101000 |
| Ethernet (10/100 Mb/s, specified in IEEE802.3) | 00110100 |
| GE (specified in IEEE802.3) | 00110101 |
| L3 Forwarding Packet | 00110110, |
| CS & NM Frame | 00110111 |
| Reserved | 00111000-11111111 |

Node 1: The higher octet (left octet) of TT is default set to "00000000" and reserved for future use.

7.3 Tributary Number (TN) Field

This 16-bit field is a number of same type of Tributary Port within a node. TN is 7 (Hex 0x0007) if the 7th ISDN or G.702 port is provided in front of panel in a node for example.

7.4 CS & NM Field

This 8-bit field is used to identify the types of control signalling and network management frame shown in Table 4 when TT is assigned to the value (Binary 00110111) of CS & NM frame. The FSN field is not used and set to Binary 00000000.

TABLE 4

Type of Control Signalling and Network Management Frame

| CS&NM Frame Types | Code |
| --- | --- |
| Reserved | 00000000 |
| CT_Request Frame | 00000111 |
| CT_Response Frame | 00001000 |
| Fault_Report Frame | 00001001 |
| Fault_Inquiry_Request Frame | 00001010 |
| Fault_Inquiry_Response Frame | 00001011 |
| Performance_Report Frame | 00001100 |
| Performance_Inquiry_Request frame | 00001101 |
| Performance_Inquiry_Response frame | 00001110 |
| CONNECTION_Request frame | 00010001 |
| CONNECTION_Confirm frame | 00010010 |
| DISCONNECTION_Request frame | 00010011 |
| DISCONNECTION_Confirm frame | 00010100 |
| MDL_ERROR_Indication Request frame | 00010101 |
| Reserved | 00010111-11111111 |

Node: The codes assignment of Tributary based protection, multicast, bandwidth policing, security and rate duplication is also shown in section 10, 11 and 12.

7.5 Frame Sequence Number (FSN) Field

This 8-bit field is used to identify Frame Sequence Number (FSN) of Ethernet or TCE data frames or IP related L3 forwarding packets in numbered modulo N_fsn=64 (default value, N_fsn is programmable and can be configured to 256 if application needs) from 0 to 63. The field is used to performance monitoring function for packet lost or duplicated of TCE based tributary. The related operation is given in section 9.3. The FSN field will be set to zero if the signalling control frames or network management frames are used.

7.5.1 Processing in the Transmit Side

The XP provides a sequence count value and a XP indication associated with each frame in the transmit side. The count value applied to FSN field and starts with 0, it is incremented sequentially to 63 and numbered modulo is 64. When the data link frames carrying Tributary payloads traverse a RPR or other topologies, they may arrive destination station disorderly, or lost or duplicated one or more frames. Due to this reason, it is required that frames must be delivered in order.

7.5.2 Processing in the Receive Side

The Data Link entity in the receive side must detect the lost or duplicated frames, and track the following status of dynamic data stream:

Frame sequence number and count;
Frame loss (if occur);
Frame duplication (if occur).

There are two ways to solve the real-time processing problem, (1) try to reorder and sort into the correct order, or (2) drop those disordering frames, when disordering case occurred. In implementation, these two methods should be all provided. If method (1) does not meet reliability transport and performance requirement still, the method (2) will be applied. Due to the limitation of native speed and acceptable delay of data link processing, this Technology does not provide correction method for bit errors and frame losses. If the event of any lost or duplicated frame occurred, data link entity will report to the layer management entity by MDL-ERROR-Indication (see 9.3.2.2.3).

7.6 Payload of XP

When Tributary or Node based Layer 3 Forwarding Packet is applied, payload field is used to encapsulate upper layer protocol data or TDM data listed in Table 4. Payload is octet-oriented and its size is variable. The default maximum frame size shall be capable of providing an information field of 1600 octets (at least) for both IPv4-based and IPv6-based applications (the providing of jumbo payload needs to align with IEEE 802.17 specification). Except for Tributary, the payload of Layer 3 forwarding packet, control signalling frame and network management is described below.

7.6.1 Layer 3 Forwarding Part

Layer 3 forwarding Packet is a packet used to forward data packet in a node. This packet is different from those packets of reaching a Tributary in a node, is also different from network management frames and control signalling frames. Logically, a RPR Lite node can be treated as a router of performing Layer 3 forwarding when a Layer 3 forwarding Packet is forwarded according to routing table and routing protocols of IPv4/IPv6 in a node from the node to other node along the RPR ring or other topologies.

7.6.2 Control Signalling and Network Management Part

The XP does work by sending both data frame into a unidirectional ringlet and the associated network management/control frames into a counter-rotating ringlet. Generic format of CS & NM Frames is the same as that of FIG. 5, just payload field is replaced by the related parameters shown in FIG. 5. The difference of the parameter field indicates various control signalling and network management frames below. The first octet of parameters field is used to identify how many parameters are used by CS & NM frame. Each parameter following 1$^{st}$ octet consists of type (or tag), length and value of the parameter. If the total octet number of parameters field is not based on 4-octet, it is optional that the octets padding (Binary 00000000) may be used.

7.6.2.1 CT_Request Frame

The code value of CT-Request Frame is binary "00000111". CT-Request Frame can be applied to point-to-point operation of Tributary based and node based, and also used to node based multicast/broadcast operation. For the Tributary based multicast/broadcast operation, please refer to as section 13 of this Technology. The major portion of CT is TCCR ID. A TCCR ID consists of TNi ID (This is an identifier of Tributary p within node x), 2-bit U/M/B field, 14-bit length field (This filed is used to represent the total number of Tributary TNj ID following length field) and one or more TNj ID (This is an identifier of Tributary q within node y). ID is a value of identifier, TNi, TNj, TNk and TNm are the ith Tributary Number of same TT of Node n, the jth Tributary Number of same TT of Node o, the kth Tributary Number of same TT of Node p and the mth Tributary Number of same TT of Node q. The values of n, o, p, q are 0 through 31, and stands for numbering of node. The values of i, j, k, l are 0 through $2^{16}-1$, and stands for tributary number with the same TT value.

Figure 6:
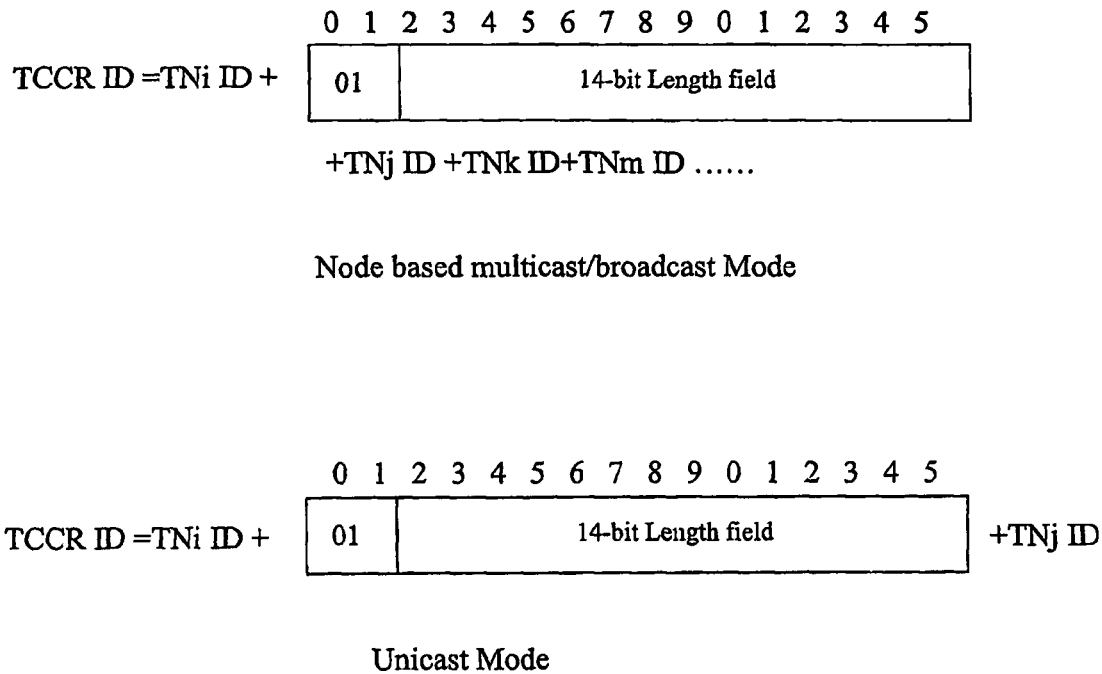
FIG. 6 illustrates Expressions of TN ID and TCCR ID according to one embodiment of the invention.

FIG. 6 illustrates Expressions of TN ID and TCCR ID according to the invention. Where note: TNi ID=NAx(x=1, 2,3 . . . 32)+TT+TNp (p=0,1,2,3, . . . $2^{16}-1$), to identify the pth Tributary with the fixed TT and TN value within ith node. For the case of Multicast/Broadcast Mode, an tributary based outgoing packet within a source node can be multicast or broadcast to a designated or source tributary (ST) of other sink nodes along a RPR ring or other topologies. Each sink node should have only a source tributary to receive this packet from ringlet at a time. If a membership group of multicast or broadcast has been established within a sink node, the said ST will duplicate this packet to other tributaries with the same membership relation.

What the ICT, CUT and Null parameters indicate is three different operations: ICT, CUT and CTI. Its type and field are described below in Table 5.

TABLE 5

Parameter Type of CT_Request Frame

| Parameter type | Parameter Field |
|---|---|
| ICT | Binary "00000001 00100000 +" octet number of parameter"+"value of TCCR ID shown in FIG. 6" |
| CUT | Binary "00000001 00100001 +" octet number of parameter"+"value of TCCR ID shown in FIG. 6" |
| Null | Binary "00000001 00100011 00000001 00000000" |

7.6.2.7 CT_Response Frame

Null parameter in CT_Response Frame is used by ICT and CUT operation. CTI parameter is followed by CTI operation.

TABLE 6

Parameter Type of CT_Request Frame

| Parameter type | Parameter Field |
|---|---|
| CTI | Binary "00000001 00100100 +" octet number of parameter"+"value of TCCR ID shown in FIG. 6" |
| Null | Binary "00000001 00100011 00000001 00000000" |

The corresponding operation can be got in 5.8 and parameter is shown in Table 6.

7.6.2.8 Fault_Report Frame

TABLE 7

Parameter Type of Fault_Report Frame

| Parameter type | Parameter Field |
|---|---|
| PSF | Binary "00000001 00000011 00000001 00000000" |
| PSD | Binary "00000001 00000010 00000001 00000000" |

The corresponding operation can be got in 5.7 and parameter is shown in Table 7.

7.6.2.9 Parameter of Fault_Inquiry_Request Frame

TABLE 8

Parameter Type of Fault_Inquiry_Request Frame

| Parameter type | Parameter Field |
|---|---|
| Null | Binary "00000001 00100011 00000001 00000000" |

The corresponding operation can be got in 5.9 and parameter is shown in Table 8.

7.6.2.10 Parameter of Fault Inquiry_Response Frame

TABLE 9

Parameter Type of Fault_Inquiry_Request Frame

| Parameter type | Parameter Field |
|---|---|
| PSF | Binary "00000001 00000011 00000001 00000000" |
| PSD | Binary "00000001 00000010 00000001 00000000" |

The corresponding operation can be got in 5.9 and parameter is shown in Table 9.

7.6.2.11 Parameter of Performance_Report Frame

TABLE 10

Parameter Type of Performance_Report Frame

| Parameter type | Parameter Field |
|---|---|
| A set of TNi in a node (designated) | Binary "00000001 01000000 +" octet number of parameter "+" value of TNi shown in FIG. 6" |
| TNFCS_15 m (Total Number of FCS error in 15 minutes, 4 octets, 4 octets length) | Binary "00000001 01000001 00000100" value of TNFCS-15 m shown in FIG. 6" |
| TNPL_15 m (Total Number of Frame Loss in 15 minutes, 4 octets length) | Binary "00000001 01000001 00000100" value of TNPL-15 m shown in FIG. 6" |
| TNFCS_24 h (Total Number of FCS error in 24 hours, 5 octets length) | Binary "00000001 01000001 00000101" value of TNFCS-24 h shown in FIG. 6" |
| TNPL_24 h (Total Number of Frame Loss in 24 hours, 5 octets length) | Binary "00000001 01000001 00000101" value of TNPL-24 h shown in FIG. 6" |

TNFCS and TNPL represents two different registers reflected values of "Total Number of FCS error" and "Total Number of Frame Loss" respectively.

The corresponding operation can be got in 5.10 and parameter is shown in Table 10.

7.6.2.12 Parameter of Performance_Inquiry_Request Frame

TABLE 11

Parameter Type of Performance_Inquiry_Request Frame

| Parameter type | Parameter Field |
|---|---|
| A set of TNi in a node (designated) | Binary "00000001 01000000 +"octet number of parameter "+"value of TNi shown in FIG. 6" |

The corresponding operation can be got in 5.10 and parameter is shown in Table 11.

7.6.2.13 Parameter of Performance_Inquiry_Response Frame

TABLE 12

Parameter Type of Performance_Inquiry_Response Frame

| Parameter type | Parameter Field |
|---|---|
| A set of TNi in a node (designated) | Binary "00000001 01000000 +" octet number of parameter"+"value of TNi shown in FIG. 6" |
| TNFCS_15 m (Total Number of FCS in 15 minutes, 4octets length) | Binary "00000001 01000001 00000100"value of TNFCS-15 m shown in FIG. 6" |
| TNPL_15 m (Total Number of Frame Loss in 15 minutes, 4octets length) | Binary "00000001 01000001 00000100"value of TNPL-15 m shown in FIG. 6" |
| TNFCS_24 h (Total Number of FCS in 24 hours, 5octets length) | Binary "00000001 01000001 00000101"value of TNFCS-24 h shown in FIG. 6" |
| TNPL_24 h (Total Number of Frame Loss in 24 hours, 5octets length) | Binary "00000001 01000001 00000101"value of TNPL-24 h shown in FIG. 6" |

TNFCS and TNPL represents two different registers reflected values of "Total Number of FCS error" and "Total Number of Frame Loss" respectively.

The corresponding operation can be got in 5.8 and parameter is shown in Table 12.

8 Tributary Loopback

Once loopback function is set, a node provides local or remote data channel shortcut from Tx interface to Rx interface in Tributary.

9 TDM Circuit Emulation (TCE) Over RPR 9.1 Introduction

This section provides a protocol model along RPR for TDM based bit-stream or octet-steam over RPR. Each station can have one or more TCEs as Tributary. TCE is operated end-to-end and is originated from the source station and terminated at the sinkstation. TCE can be operated in the way of half-duplex point-to-point, full-duplex point-to-point or half-duplex point-to-multipoint.

9.2 Protocol Framework of TDM Circuit Emulation (TCE)

Figure 7:
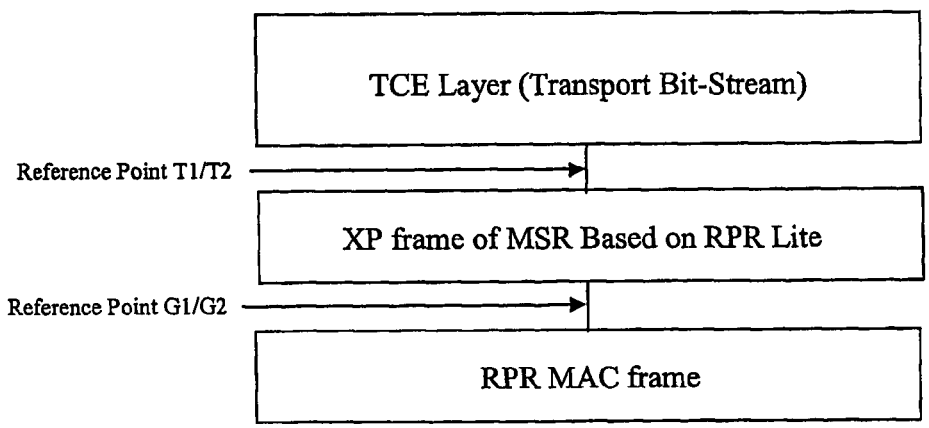
FIG. 7 shows TDM service channel over RPR MAC frame using XP according to one embodiment of the invention.

The protocol framework of TCE is involved in the underlying RPR MAC aggregate pipe shown in FIG. 7. The functions of encapsulation, real-time transport of order, detection of disorder and duplication, sorting, error report, primitives and related parameters, and timing synchronous processing etc are performed within the XP.

FIG. 7 shows TDM service channel over RPR MAC frame using XP according to the invention.

9.3 Services Provided by RPR Data Link 9.3.1 Definitions

The layer services provided by RPR Data link to TCE layer are:

Transfer of service data units with a constant source bit rate from TCE layer and the delivery of them with the same bit rate in RPR data link layer; and/or Transfer of timing information between source and destination; and/or Transfer of structure information between source and destination; and/or Indication of lost, duplicated or errored information that is not recovered by RPR data link if needed.

9.3.2 Primitives Between XP and the XP User 9.3.2.1 General

At the Service Access Point (SAP) of XP layer, the following primitives is used between the XP and the TCE layer:

From a TCE layer to the XP,
  XP-UNACK-DATA Request;
From the XP to the TCE layer,
  XP-UNACK-DATA Indication.
From the XP to the management entity;
  MDL-ERROR Indication.

A XP-UNACK-DATA request primitive at the local XP-SAP will result in a XP-UNACK-DATA indication primitive at its peer XP-SAP.

9.3.2.2 Definition of XP Primitives 9.3.2.2.1 XP-UNACK-DATA Request (Not be Used to Signalling Frame)

XP-UNACK-DATA request (USERDATA [Necessary],
  STRUCTURE [optional])

The XP-UNACK-DATA request primitive requests the transfer of the XP-SDU, i.e. contents of the USERDATA parameter, from the local XP entity to its peer entity. The length of the XP-SDU and the time interval between two consecutive primitives is constant. These two constants are a function of the XP service provided to the TCE layer.

9.3.2.2.2 XP-UNACK-DATA Indication (Does not Have Signalling Frame)

XP-UNACK-DATA indication (USERDATA [Necessary],
  STRUCTURE [optional],
  ERROR [optional])

A XP user is notified by the XP that the XP-SDU, i.e. contents of the USERDATA parameter, from its peer is available. The length of the XP-SDU and the time interval between two consecutive primitives should be constant. These two constants are a function of the XP service provided to the TCE layer.

9.3.2.2.3 MDL-ERROR Indication

MDL-ERROR indication (T_error [Necessary],
REG_lost [optional],
REG_duplicated [optional])

REG_lost and REG_duplicated parameters are used to identify how many sequence frames are lost and duplicated by FSN detection from the transmit side to receive side in the specific period (T_error). Once sequence lost or duplicated is occurred, MDL-ERROR indication will be applied.

9.3.2.4 Definition of Primitive Parameters

9.3.2.4.1 USERDATA Parameter

The USERDATA parameter carries the XP-SDU to be sent or delivered. The size of each block to be delivered depends on the specific XP layer service used. For the same type of TCE payload, i.e. ITU-T G.702 PDH circuit, the payload length of XP-PDU is constant and default is set to 64 octets. For the provided TCE payloads, the payload length of XP-PDUs is used as following.

TABLE 13

Selection of Default Payload Length of XP-PDU

| Types of TCE payload | Default Payload Length of XP-PDU (octets) |
| --- | --- |
| G.702 PDH circuit - Synchronous circuit transport | 64 |
| G.702 PDH circuit - Asynchronous circuit transport | 64 |
| Video signal - Distributive television services | 188 |
| Video signal - Conversational services of bit rates higher than primary rates | 188 |
| Video signal - Conversational services of p×64 kbit/s signals | 188 |
| Voiceband signal - 64 kbit/s A-law or µ-law coded Recommendation G.711 signals | 64 |
| Digital channel supported by 64 kbit/s-based ISDN - Transport of 64 kbit/s channel | 64 |
| Digital channel supported by 64 kbit/s-based ISDN - Transport of 384, 1536 or 1920 kbit/s channel | 64 |

9.3.2.4.2 STRUCTURED Parameter (Option of XP-UNACK-DATA Primitive)

The STRUCTURED parameter can be used when the data stream of TCE layer to be transferred to the peer XP entity is organized into groups of bits. The length of the structured block is fixed for each instance of the XP service. The length is an integer multiple of 32 bits. An example of the use of this parameter is to provide circuit mode bearer services of the 64 kbit/s-based ISDN. The two values of the STRUCTURED parameter are:
BOUND and
DATA-STREAM.

The value BOUND is used when the USERDATA is the first part of a structured block which can be composed of consecutive USERDATA. In other cases, the structure parameter is set to DATA-STREAM. The use of the STRUCTURED parameter depends on the type of XP service provided. The use of this parameter is agreed prior to or at the connection establishment by network management between the TCE layer and the Data Link layer. In most application, the function of "STRUCTURE parameter" has been covered by the transform and adaptation function of Tributary at the Tributary interface within a node since XP uses pre-plan and connection oriented policy, and TCCR is made (e.g. ISDN 64 kb/s Tributary source in a node to ISDN 64 kb/s Tributary sink, E1 Tributary source in a node to E1 Tributary sink) by network management entity or control signalling before Tributary service is operated on-line.

9.3.2.4.3 ERROR Parameter (Option of XP-UNACK-DATA Primitive)

The ERROR parameter is involved to identify that the USERDATA is errored or non-errored. The ERROR parameter has two values:
NO and
YES.

The "YES" value does imply that the USERDATA covers a dummy value within this frame. The "NO" value implies that the no error is found from transmit to receive side. The use of the ERROR parameter and the choice of dummy value depend on the type of XP service provided. The use of this parameter is agreed prior to or at the connection establishment of TCCR between the TCE layer and the XP layer.

9.3.2.4.4 T_error, REG_lost and REG_duplicated Parameters

The connection management entity is used to monitor the error status of receiving the peer link frame at peer-to-peer level. It is local matter only and has not any associated frame to be used between the two sides.

REG_lost and REG_duplicated parameters are attached to MDL-ERROR Indication primitive to identify how many sequence frames are lost and/or duplicated from the transmit side to receive side in the specific period (T_error). Their accumulation values are stored and transformed to the two specific registers in the receive side. The parameter T_error in the unit of second is an initial value (15 minutes and 24 hours are two default values) and configurable by the network management entity according to the rate of specific service over XP. Each Tributary has the corresponding REG_lost and REG_duplicated, and is separated operated from other Tributary. At the beginning of RPR Data Node start-up, the REG_lost and REG_duplicated of each Tributary are clear and set to zero.

If the timer T_error expires before no lost or duplicated frames are received, the link entity shall restart timer T_error. The XP entity shall not indicate this to the local connection management entity.

Once the timer T_error expires if any lost or duplicated frame is received, the XP entity shall indicate this to the local connection management entity by means of the MDL-ERROR indication primitive, and restart timer T_error.

9.4 Provided Functions of XP for TCE Case

The following functions can be performed in the XP in order to meet requirements of TDM timing, structure, jitter and wander:
a) source clock frequency recovery at the receiver;
b) recovery of the source data structure at the receiver;
c) blocking and deblocking of XP user information;
d) control of frame latency variation;
e) processing of lost or duplicated frames;

NOTE—For some XP users, the end-to-end QOS monitoring may be needed to provide. This function can be achieved by calculating a FCS, reporting lost or duplicated frames in the default period (e.g. 15 minutes and 24 hours) for the XP-PDU, A corresponding periodic count of FCS computation, values of REG_lost and REG_duplicated are sent to network management entity.

9.4.1 TCE Processing Mode

9.4.1.1 Processing Mode of G.702 PDH

For this sub-section, it is necessary to identify TCE data structure and the clock operation mode at the XP service boundary, i.e. framing or non-framing, types of clock (synchronous or asynchronous) where needed to make comparison to a network clock. Asynchronous and synchronous TCE transport provides transport of signals from TCE sources whose clocks are non-frequency-locked and frequency-locked to a network clock respectively. The judgement of synchronous or asynchronous will depend on the service provided by the specific network, i.e. PDH, SDH, or ISDN. Care should be taken to select the shortest transport path, control priority of delivery and transient, and reduce transport latency and latency variation along RPR during the project installation phase.

1) Asynchronous G.702 circuit

Circuit rate at XP service boundary: 1.544, 2.048, 6.312, 8.448, 44.736 and 34.368 Mbit/s as specified in Recommendation G.702.

Payload size to be encapsulated: see Table 13

Source clock frequency recovery: Asynchronous frequency

Error status indication at the receiver: count report of lost or duplicated frames by MDL-ERROR Indication primitive.

2) Synchronous G.702 circuit

Circuit rate at XP service boundary: 1.544, 2.048, 6.312, 8.448, 44.736 and 34.368 Mbit/s as specified in Recommendation G.702.

Payload size to be encapsulated: see Table 13

Source clock frequency recovery: Synchronous timing

Error status indication at the receiver: count report of lost or duplicated frames by MDL-ERROR Indication primitive.

9.4.1.2 Processing Mode of Video Signal Transport

This sub-section presents the processing mode of Video signal transport. Care should be taken to select the shortest transport path, control priority of delivery and transient, and reduce transport latency and latency variation along RPR during the project installation phase.

1) Mode of Conversational services of p×64 kbit/s signals

This sub-section gives the processing mode of interactive video signals of the p×64 videotelephony and videoconference applications as specified in Recommendation H.320.

a) Circuit rate at XP service boundary: 384, 1536 or 1920 kbit/s in the 64 kbit/s-based ISDN by using H0, H11, H12, respectively.

b) Payload size to be encapsulated: see Table 13 c) Source clock frequency recovery: Synchronous timing d) Error status indication at the receiver: count report of lost or duplicated frames by MDL-ERROR Indication primitive.

2) Mode of Distributive television services

This sub-section illustrates transport of distributive television signals encoded by using MPEG2 with a constant bit rate specified in Recommendation J.82.

a) Circuit rate at XP service boundary: Depending on MPEG2 parameters b) Payload size to be encapsulated: see Table 13 c) Source clock frequency recovery: Asynchronous frequency d) Error status indication at the receiver: count report of lost or duplicated frames by MDL-ERROR Indication primitive.

3) Mode of Conversational services of bit rates higher than primary rates

This sub-section illustrates transport of interactive video signals for, i.e. video-telephony and conference application specified in Recommendation H.310.

a) Circuit rate at XP service boundary: Depending on H.310 parameters b) Payload size to be encapsulated: see Table 13 c) Source clock frequency recovery: Synchronous/Asynchronous per Recommendation H.310 d) Error status indication at the receiver: count report of lost or duplicated frames by MDL-ERROR Indication primitive. Recommendation H.310 should be taken into account.

9.4.1.3 Processing Mode of Digital Channel Supported by 64 kbit/s-based ISDN

This sub-section presents the processing mode of digital channel supported by 64 kbit/s-based ISDN. Care should be taken to select the shortest transport path, control priority of delivery and transient, and reduce transport latency and latency variation along RPR during the project installation phase.

1) Mode of 64 kbit/s channel a) Circuit rate at XP service boundary: 64 kbit/s b) Payload size to be encapsulated: see Table 13 c) Source clock frequency recovery: Synchronous timing d) Error status indication at the receiver: count report of lost or duplicated frames by MDL-ERROR Indication primitive.

2) Mode of 384, 1536 or 1920 kbit/s channel a) Circuit rate at XP service boundary: 384, 1536 or 1920 kbit/s b) Payload size to be encapsulated: see Table 13 c) Source clock frequency recovery: Synchronous timing d) Error status indication at the receiver: count report of lost or duplicated frames by MDL-ERROR Indication primitive.

9.4.1.4 Processing Mode of Voice-band Signal

This sub-section presents the processing mode of 64 kbit/s A-law or μ-law coded Recommendation. G.711 signals. Care should be taken to select the shortest transport path, control priority of delivery and transient, and reduce transport latency and latency variation along RPR during the project installation phase.

a) Circuit rate at XP service boundary: 64 kbit/s b) Payload size to be encapsulated: see Table 13 c) Source clock frequency recovery: Synchronous timing d) Error status indication at the receiver: count report of lost or duplicated frames by MDL-ERROR Indication primitive.

9.4.2 TCE Function of RPR Data Link 9.4.2.1 TCE Functions for Circuit

The following sections provide both asynchronous and synchronous TCE transport function along RPR or other topologies. Asynchronous and synchronous TCE supports transport of signals from constant bit rate sources whose clocks are non-frequency-locked and frequency-locked respectively to a network clock. Asynchronous examples are Recommendation G.702 signals at 1.544, 2.048, 6.312, 8.448, 32.064, 44.736 and 34.368 Mbit/s, Synchronous examples are at 64, 384, 1536 and 1920 kbit/s as specified in Recommendation I.231.

1) Consideration of XP user information

The length of the XP-SDU is 64 octets. A XP-SDU constitutes one XP PDU payload.

For those XP users that require a peer-to-peer presetting of structured data, i.e. 8 kHz structured data for circuit mode bearer services of the 64 kbit/s-based ISDN.

2) Processing strategy of frame delay variation

A buffer mechanism is used to provide this function. In the event of buffer underflow, it can be necessary for the XP to maintain bit count integrity by inserting the appropriate number of dummy bits. In the event of buffer overflow, it may be necessary for the XP to maintain bit count integrity by dropping the appropriate number of bits.

When Recommendation G.702 1.544 Mbit/s and 2.048-Mbit/s signals are being transported, the inserted dummy bits shall be all "1"s.

3) Processing strategy of lost and duplicated frames

A destination XP can determine whether the frames have been lost by tracking the Frame Sequence Number (FSN) or sequence count values of the received XP PDUs. Detected duplicated frames are discarded. The XP procedure to be used for sequence count processing is described in 11.5.2.

In order to maintain the bit count integrity of the XP user information, it may be necessary to compensate for lost frames detected by buffer underflow and sequence count processing by inserting the appropriate number of dummy payloads. The content of this dummy payload depends on the XP service being provided. For example, this dummy payload is all "1"s for Recommendation G.702 1.544 Mbit/s and 2.048-Mbit/s signals.

4) Guaranty of jitter and wander

This function is required for delivery of XP-SDUs to a XP user at a constant bit rate. Recovered source clock should meet the requirement of jitter and wander performance of the related Recommendation used. For example, the jitter and wander performance for Recommendation G.702 signals is specified in Recommendations G.823 and G.824, for which the XP procedure to be used.

9.4.2.2 TCE Functions of Video Signal

The following sections present processing of video signals for interactive and distributive services:

1) Consideration of XP user information

The length of the XP-SDU is 188 octets. A XP-SDU constitutes one XP PDU payload.

For those XP users that require a peer-to-peer presetting of structured data. Depending on the type of XP service provided (i.e. the interface to the XP user), the ERROR parameter will be passed to the XP user to facilitate further picture processing.

2) Processing strategy of frame delay variation

A buffer mechanism is used to provide this function. The size of this buffer is dependent upon specifications video signal. In the event of buffer underflow, it may be necessary for the XP to maintain bit count integrity by inserting the appropriate number of dummy bits. In the event of buffer overflow, it may be necessary for the XP to maintain bit count integrity by dropping the appropriate number of bits.

3) Processing of lost and duplicated frames

A destination XP can determine whether the frame has been lost by tracking the Frame Sequence Number (FSN) or sequence count values of the received XP PDUs. Detected duplicated frames are discarded. The XP procedure to be used for sequence count processing is described in 11.5.2.

In order to maintain the bit count integrity of the XP user information, it may be necessary to compensate for lost frames detected by buffer underflow and sequence count processing by inserting the appropriate number of dummy payloads. The content of this dummy payload depends on the XP service being provided.

Information in lost frames may be recovered by the mechanism described in e).

4) Guaranty of jitter and wander

This function is required for delivery of XP-SDUs to a XP user at a constant bit rate.

Some XP users may require source clock frequency recovery, i.e. recovery in the receive side of camera clock frequency that is not locked to the network clock. The XP procedures available for that purpose are given in 11.5.2.

9.4.2.3 TCE Functions of Voice-band Signal

The following sections provide processing of a single voice-band signal, i.e. one 64 kbit/s A-law or μ-law coded Recommendation G.711 signal.

1) Consideration of XP user information

The length of the XP-SDU is 64 octets. A XP-SDU constitutes one XP PDU payload.

2) Processing of frame delay variation

A buffer mechanism is used to provide this function. The size of this buffer depends on specifications provided in voice-band signal.

3) Processing strategy of lost and duplicated frames

For voice-band signals, there is a need still to detect duplicated and lost frames.

The receiving XP entity must detect/compensate for lost frame events to maintain bit count integrity and must also minimize the delay, i.e. to alleviate echo performance problems, in conveying the individual voice-band signal octets from the XP-PDU payload to the XP user.

The receiving XP entity may take actions based on the received Sequence Number values, but such actions must not increase the conveyance delay across the XP receiving entity to alleviate echo performance problems.

The XP receiving entity must accommodate a sudden increase or decrease in the nominal frame transfer delay. (A protection switching event in the RPR may result in a change of transfer delay.)

4) Guaranty of jitter and wander

The XP provides synchronous circuit transport for the voice-band signal.

NOTE 1—Example receiver techniques using a timing-based mechanism or a buffer-fill-based mechanism, possibly supplemented by a Sequence Number processing algorithm that does not introduce additional delay.

NOTE 2—For transporting signals of speech and 3.1 kHz audio bearer services as specified in 64 kbit/s ISDN, the need for A/μ-law conversion is identified. The conversion between A-law and μ-law coded PCM octets are as specified in Recommendation G.711. This conversion function is outside the scope of this Technology.

9.4.2.4 TCE Functions of High Quality Audio Signal

The case is the same as the above. The TCE functions of high quality audio signals in XP include the following capabilities in principle.

a) Consideration of XP user information;
b) Processing strategy of frame delay variation;
c) Processing of lost and duplicated frames;
d) Guaranty of jitter and wander;

9.5 XP Protocol Involved to Support TCE

The following sub-sections describe XP procedures to be provided for implementing XP functions involved to support TCE.

9.5.1 Processing Strategy of Frame Sequence Number (FSN)

9.5.1.1 Processing in the Transmit Side

The XP provides a sequence count value and a XP indication associated with each XP-PDU payload in the transmit side. The count value applied to FSN field starts with 0, is incremented sequentially to 63 and is numbered modulo 64 when TT field is set to provide TCE function. When the data link frames carrying TCE payloads traverse a RPR or other topologies, then may arrive destination station disorderly. Due to this reason, it is required that frames must be delivered in order. Ensuring in-order delivery is also effective approach to out-of-order detection.

9.5.1.2 Processing in the Receive Side

The XP receives and derives the following information associated with each XP-PDU payload in receive side:
sequence number;
count;
check error of the frame sequence number and count.

The implementation of sequence count values and number will be described on a service specific basis (e.g. REG_lost and REG_duplicated). The XP entity in the receive side identifies lost or duplicated XP-PDU payloads.

XP entity tracks the following status of dynamic data stream:
XP-PDU payload sequence number and count;
XP-PDU payload loss (if occur);
XP-PDU payload duplication (if occur).

There are two ways to solve the real-time processing problem, (1) try to reorder and sort into the correct order or (2) drop those disordering frames, when disordering case occurred. In implementation, These two methods should be all provided. If method (1) does not meet reliability transport and performance requirement still, the method (2) will be applied. Due to the limitation of native speed and acceptable delay of data link payloads listed in Table 13, this Technology does not provide correction method for bit errors and frame losses.

9.5.2 Recovery Method of Timing and Structured Information

To provide TCE services available in Table 13, the requirements of timing and structured information should be based on the native characteristics of the these services, and it is necessary for these TCEs to recover these signal characteristics as closely described in the related standard as possible in the receive side, including the signal jitter, bit-rate, timing characteristics and structured information transfer (if it has) as it was sent. In most application, STRUCTURE information could be provided by the transform and adaptation function of Tributary at the Tributary interface within a node since XP uses pre-plan and connection oriented policy, and TCCR is made (e.g. ISDN 64 k/bits Tributary source in a node to ISDN 64 k/bits Tributary sink, E1 Tributary source in a node to E1 Tributary sink) by network management entity or control signalling before Tributary service is operated on-line.

For the timing characteristics, there are two methods involved: timing (synchronous) signalling broadcasted periodically from that designated station with an external synchronous source along the RPR ring or other topologies, or timing (synchronous) information received from an external facility for referencing to all stations.

SYNCHRONIZATION Request (Local NA, T_sync)

The signalling frame of broadcast SYNCHRONIZATION Request primitive has been assigned to have the highest priority among all other signalling frame used in this Technology. The broadcasted period is Timer T_sync. Its default value is 8000 frames per second. This value is programmable and can be changed by network management entity.

SYNCHRONIZATION Confirm (Non parameter)

After getting the signalling frame of SYNCHRONIZATION Request, said each station will align the phase relations of its oscillator facility (including frequency-locked) and send SYNCHRONIZATION Confirm signalling frame with lower priority to that source station initiated the signalling frame of SYNCHRONIZATION Request. The codes of these two signalling are listed in the Table 5.

Since the service types and connection relations of TCEs from source to destination, including Node address, TT and TN, are pre-plan before service Tributary is operated, said initial timing (except for phase relations and actual bit-stream) and structured information should be pre-set by configuration function of network management entity before operation of those TCE services. The phase relations and actual bit-stream of TCE signals are designed to perform the extraction of output transmission bit timing information from the delivered frame stream, and requires a phase-locking mechanism.

9.6 Management Function Involved to Support TCE

The following functions is required to be provided to the network management entity:

9.6.1 TCE Property (Including Structured Information of Data Stream) Mismatch Between the Source and Destination The related operation is described detailed and refer to section 5.8.

10 Tributary Based Protection (TBP)

The said Tributary of this section is a logical service channel used in section 3, such as TCEs with a fixed value of Tributary Type (TT) and Tributary Number (TN) in the frame format. The application scope of Tributary based protection involved in this section is located at full-duplex point-to-point application only. The tributary protection operation of half-duplex point-to-point, multicast and broadcast will not be the scope of this section. A Node of RPR can provide support of multiple ETBP and Multiple TTBP at the same time.

10.1 Ethernet Tributary Based Protection (ETBP)

In the case of non-TBP, IPG (Inter Packet Gap of RPR) is not used to map into payload of RPR MAC (In most case, the bandwidth of aggregate pipe is greater than or equals to that of total tributaries), just like X.86/Y. 1323 (Ethernet over LAPS) transmits Ethernet traffic in order to save line bandwidth. But once an Ethernet or Gigabit Ethernet Tributary is set to provide TBP by network management entity, transmitting and mapping IPG messages of the Ethernet or GE into XP payload are basic function and are required to provide to link operation. When needed to provide the ETBP Function, ETBP Function Unit embedded in the corresponding Tributary as an attachment in XP entity will be activated by the configuration function of network management entity (this configuration function is performed either in the projection installation phase or RPR Lite on-line operation phase) and the corresponding Tributary is set to a Working Tributary.

For Operation of 1+1 ETBP, it is needed to designate a mate Standby Tributary with the same service property, source and destination. The payloads of the mate Working Tributary and Standby Tributary will carry the same traffic.

For 1:1 ETBP, it is also needed to designate a mate Standby Tributary with the same service property, source and destination. The payloads of the Standby Tributary can carry the other additional traffic (Once ETBP occurred for this Working Tributary, the additional traffic will be destroyed).

For 1:N ETBP, there are multiple Working Tributaries (e.g. number is N), it is also needed to designate a mate Standby Tributary with the same service property, source and destination. The payloads of the Standby Tributary can carry the other additional traffic (Once ETBP in one of N Working Tributary occurred, this additional traffic will be destroyed).

The CS&NM operational codes of ETBP are listed in the Table 14.

TABLE 14

Codes of ETBP frame

| CS&NM Frame Types | Code |
| --- | --- |
| 1+1 ETBP_Request Frame | 00100001 |
| 1+1_ETBP_Response Frame | 00100010 |
| 1:1 ETBP_Request Frame | 00100011 |
| 1:1_ETBP_Response Frame | 00100100 |
| 1:N ETBP_Request Frame | 00100101 |
| 1:N_ETBP_Response Frame | 00100110 |

Note:
1+1 and 1:1 ETBP_Request Frame is a multicast frame and should be issued to four ends of two targeted Tributaries (including the working and standby tributaries) at the same time.
1:N ETBP_Request Frame is a multicast frame and should be issued to multiple ends of targeted Tributaries (including the N working tributaries and a standby tributary) at the same time.

The parameters of 1+1 ETBP_Request Frame and 1:1 ETBP_Request Frame have the same format as that of the unicast mode of TCCR ID. This parameter consists of TNi ID (This is an identifier of Tributary p within node x), 2-bit U/M/B field, 14-bit length field (This filed is used to reflect the total number of Tributary TNj ID following length field, its value should be binary 00000000000001) and a TNj ID (This is an identifier of Tributary q within node y).

FIG. 8 illustrates Expressions of 1+1 and 1:1 tributary protection parameters according to the invention. Where note: TNi ID=NAx(x=1,2,3 . . . 32)+TT+TNp (p=0,1,2,3, . . . $2^{16}$−1), to identify the pth Tributary with the fixed TT and TN value within xth node. TNi ID and TNj ID stand for standby and working tributary respectively.

The parameters of 1+1 ETBP_Response Frame and 1:1 ETBP_Response Frame are the same as that of 1+1 ETBP_Request Frame and 1:1 ETBP_Request Frame respectively.

The parameters of 1:N ETBP_Request Frame have the same format as that of the multicast/broadcast mode of TCCR ID. This parameter also consists of TNi ID (This is an identifier of Tributary p within node x), 2-bit U/M/B field, 14-bit length field (This filed is used to reflect the total number of Tributary TNj ID following length field, its value should be binary 00000000000001) and a TNj ID (This is an identifier of Tributary q within node y).

FIG. 9 shows Expressions of 1:N tributary protection parameter according to the invention. Where note: TNi ID=NAx(x=1,2,3 . . . 32)+TT+TNp (p=0,1,2,3, . . . $2^{16}$−1), to identify the pth Tributary with the fixed TT and TN value within xth node. TNI ID is used to present standby tributary, and TNi ID, TNk ID and TNm ID etc represent working tributary, the total number is N.

The parameters of 1+1 ETBP_Response Frame, 1:1 ETBP_Response Frame and 1:N ETBP_Response Frame are described in the Table 15.

TABLE 15

Parameters of ETBP_Response Frame

| CS&NM Frame Types | Code |
| --- | --- |
| ETBP successful | Binary "00000001 00010001 00000001 00000000" |
| ETBP unsuccessful | Binary "00000001 00010010 00000001 00000000" |

The ETBP Function Unit is used to monitor the link status of receiving the peer link frames at the reference point T1/T2. It is local matter only and has not any associated frame to be used between the two sides.

After initialization (the defaults of T_etbp and N_etbp are set to 10 mill-seconds and 4 respectively), the link entity enters the normal way of transmitter and receiver.

If the timer T_etbp expires before any frame (including information frame and IPG) is received, the link entity shall restart timer T_etbp and decrement the retransmission counter N_etbp.

If the timer T_etbp expires and retransmission counter N_etbp has been decremented to zero before any MAC frame or Inter-frame Gap from the aggregate is received, the link entity of the aggregate shall inform the all local Tributary entities (within a node), which are set to have the other protection Tributary, of error report by sending a Error-Hello message from entity of the aggregate to those entities of Tributary within that node. After getting Error-Hello, the local Tributary entity will perform an action of ETBP (1+1, 1:1 or 1:N) to the corresponding Standby Tributary within the same node, change previous transmission channel of aggregate to the counter-rotating ringlet of pre-setting. After the entity of Tributary enters into the normal transmission operation, the local aggregate entity will restart timer T_etbp and recover the value of N_etbp. Every Standby Tributary has its T_etbp and N_etbp of itself.

For the case of 1:1 and 1:N, after the ETBP Function Unit receives Error-Hello message, the link entity in the transmit side will perform an action of ETBP (1:1 or 1:N) to the corresponding Standby Tributary.

The value of T_etbp and N_etbp shall be configurable. The minimum unit configured of T_etbp and N_etbp is 1 milliseconds and 1 respectively.

Once ETBP Function Unit detects that the failure span is recovered and enters normal status from the TTBP (that is, stop Error-Hello Message), ETBP Function Unit will wait T_etbp_wtr (The default to 10 minutes, its value is also programmable and should be much greater than T_ttbp), and then switch to the Working Tributary. After switching to the Working Tributary, ETBP Function Unit issues an ETBP_RECOVERY_EVENT_Report with parameters of TT and TN to network management entity.

10.2 TCE Tributary Based Protection (TTBP)

When needed to provide the TTBP function, TTBP Function Unit embedded in the corresponding Tributary in XP entity will be activated by the configuration of network management (this configuration is performed either in the projection installation phase or RPR on-line operation phase) and the corresponding Tributary is set to a Working Tributary.

For Operation of 1+1 TTBP, it is needed to designate a mate Standby Tributary with the same service property, source and sink. The payloads of the mate Working Tributary and Standby Tributary carrying the same traffic are required.

For 1:1 TTBP, it is also needed to designate a mate Standby Tributary with the same service property, source and sink. The payloads of the Standby Tributary can run the other additional traffic (Once TTBP occurred for this Working Tributary, the additional traffic will be dropped out).

For 1:N TTBP, there are N Working Tributaries; it is also needed to designate a mate Standby Tributary with the same service property, source and sink. The payloads of the Standby Tributary can run the other additional traffic (Once TTBP in one of N Working Tributary occurred, this additional traffic will be dropped out).

The CS&NM operational codes of TTBP are listed in the Table 16.

TABLE 16

Codes of TTBP frame

| CS&NM Frame Types | Code |
|---|---|
| 1+1 TTBP_Request Frame | 00100111 |
| 1+1_TTBP_Response Frame | 00101000 |
| 1:1 TTBP_Request Frame | 00101001 |
| 1:1_TTBP_Response Frame | 00101010 |
| 1:N TTBP_Request Frame | 00101011 |
| 1:N_TTBP_Response Frame | 00101100 |
| TTBP_RECOVERY_EVENT_Report | 00101101 |

Note:
1+1 and 1:1 TTBP_Request Frame is a multicast frame and should be issued to four ends of two targeted Tributaries (including the working and standby tributaries) at the same time.
1:N TTBP_Request Frame is a multicast frame and should be issued to multiple ends of targeted Tributaries (including the N working tributaries and a standby tributary) at the same time.

The parameters of the 1+1, 1:1 and 1:N TTBP Response frame in this sub-section are described in Table 17.

TABLE 17

Parameters of Bandwidth Limitation_Response Frame

| CS&NM Frame Types | Code |
|---|---|
| TTBP successful | Binary "00000001 00010011 00000001 00000000" |
| TTBP unsuccessful | Binary "00000001 00010100 00000001 00000000" |

The parameters of 1+1 TTBP_Request Frame and 1:1 TTBP_Request Frame have the same format as that of the unicast mode of TCCR ID. This parameter consists of TNi ID (This is an identifier of Tributary p within node x), 2-bit U/M/B field, 14-bit length field (This filed is used to reflect the total number of Tributary TNj ID following length field, its value should be binary 00000000000001) and a TNj ID (This is an identifier of Tributary q within node y).

FIG. 10 shows Expressions of 1+1 and 1:1 tributary protection parameters according to the invention. Note: TNi ID=NAx(x=1,2,3 ... 32)+TT+TNp (p=0,1,2,3, ... $2^{16}$−1), to identify the pth Tributary with the fxed TT and TN value within xth node. TNi ID and TNj ID stand for standby and working tributary respectively.

The parameters of 1+1 TTBP_Response Frame and 1:1 TTBP_Response Frame are the same as that of Request primitives above.

The parameters of 1:N TTBP_Request Frame have the same format as that of the multicast/broadcast mode of TCCR ID. This parameter also consists of TNi ID (This is an identifier of Tributary p within node x), 2-bit U/M/B field, 14-bit length field (This filed is used to reflect the total number of Tributary TNj ID following length field, its value should be binary 00000000000001) and a TNj ID (This is an identifier of Tributary q within node y). Please refer to as FIG. 11.

FIG. 11 shows Expressions of 1:N tributary protection parameter according to the invention. Note: TNi ID=NAx (x=1,2,3 ... 32)+TT+TNp (p=0,1,2,3, ... $2^{16}$−1), to identify the pth Tributary with the fixed TT and TN value within xth node. TNi ID is used to present standby tributary, and TNj ID, TNk ID and TNm ID etc represent working tributary, the total number Is N.

The TTBP Function Unit is used to monitor the link status of Tributary by monitoring the peer link frames of an aggregate. Normally, the entity in the receive side of aggregate does always receive the MAC frame or Inter-frame Gap from the peer. No link-error occurs and no Error-Hello is also sent to the local Tributary entity within a node. It is local matter only and has not any associated frame to be used between the two sides.

After initialization (the defaults of T_ttbp and N_ttbp are set to 10 mill-seconds and 3 respectively), the link entity enters the normal way of transmitter and receiver.

If the timer T_ttbp expires before any MAC frame or Inter-frame Gap from the aggregate is received, the link entity of aggregate shall restart timer T_ttbp and decrement the retransmission counter N_ttbp.

If the timer T_ttbp expires and retransmission counter N_ttbp has been decremented to zero before any MAC frame or Inter-frame Gap from the aggregate is received, the link entity of the aggregate shall inform the all local Tributary entities (within a node), which are set to have the other protection Tributary, of error report by sending a Error-Hello message from entity of the aggregate to those entities of Tributary within that node. After getting Error-Hello, the local Tributary entity will perform an action of TTBP (1+1, 1:1 or 1:N) to the corresponding Standby Tributary within the same node, change previous transmission channel of aggregate to the counter-rotating ringlet of pre-setting. After the entity of Tributary enters into the normal transmission operation, the local aggregate entity will restart timer T_ttbp and recover the value of N_ttbp. Every Standby Tributary has its T_ttbp and N_ttbp of itself.

The value of T_ttbp and N_ttbp shall be configurable. The minimum unit configured of T_ttbp and N_ttbp is 1 milliseconds and 1 respectively.

Once TTBP Function Unit detects that the failure span is recovered and enters normal status from the TTBP, TTBP Function Unit will wait T_ttbp_wtr (The default to 10 minutes, its value is also programmable and should be much greater than T_ttbp), and then switch to the Working Tributary. After switching to the Working Tributary, TTBP Function Unit issues a TTBP_RECOVERY_EVENT_Report with parameters of TT and TN to network management entity.

11 Tributary Based Multicast (TBM)

The Tributary of this section is a logical service channel used in section 3, such as TCE with a fixed value of Tributary Type (TT) and Tributary Number (TN) in the RPR frame. The application scope of Tributary Based Multicast (TBM) is located at the operation of half-duplex point-to-multi-point only. The full-duplex point-to-point will not be recommended to the scope of this section.

The TBM Function Unit built in a Node is used to provide one or more independent hierarch of multicast possibly involved the same or different TT at the same time. TBM Function Unit implements a duplication function within a node (station) from a Tributary getting a payload of a frame from the related topologies to other multiple Tributary with the same TT value and with being set to have a relation of membership group. A group of TN with the same TT value within a Node can be set to become a membership group of multicast/broadcast. It is required that a designated Tributary in the membership group should receive data frames at the reference point G1 from the related topologies. This Technology uses this designated Tributary as a Source Tributary (ST). Once getting data frames, the ST duplicates those frames to every Tributary in the corresponding membership group within a node. The ST should be set and designated to a given value of TT and TN by network management entity during the project installation phase or on-line operation phase. The one or more STs can be designated or changed dynamically within a node according to the customer requirements.

The CS&NM operational codes of TBM are listed in the Table 18.

TABLE 18

Codes of TBM frame

| CS&NM Frame Types | Code |
|---|---|
| TBM_Request Frame | 00101101 |
| TBM_Response Frame | 00101110 |

If a TBP is applied to operation of TBM, it is recommended that a ST be designated to a Working Tributary, and the ST can also be operated to become the working Tributary of 1+1 and 1:1 application described in section 10.1 and 10.2.

The parameters of TBM_Request and TBM_Response frame in this sub-section are described in Table 19 if the multicast/broadcast field is changed from "01" to "10" or "11".

TABLE 19

Parameters of TBM_Response Frame

| CS&NM Frame Types | Code |
|---|---|
| TBM successful | Binary "00000001 00010101 00000001 00000000" |
| TBM unsuccessful | Binary "00000001 00010110 00000001 00000000" |

12 Bandwidth Policing, Merging, Line-Speed Filtering, Stacking and Mirroring of Tributary

12.1 Tributary Based Policing—Bandwidth Limitation with Symmetry and Asymmetry TCE rate at XP service boundary should be operated and be fully compliant with the IEEE 802.3, G.702, ISDN and other related standards in the normal case. But in some application of service level agreement, the policy of operation and maintenance needs a limitation for rate to perform the bandwidth-based accounting. The RPR entity provides a Bandwidth Limitation Function Unit.

When this Function Unit is activated to a Tributary, this Tributary provides configuration incremental level with minimum unit granularity (64 k/bits for TCE) from 0 to the standard value. The corresponding standard values of bandwidth are described in the related standard and must not be passed over. Once bandwidth is set up for a Tributary during project installation or on-line operation phase, this programmable threshold limit applies to this Tributary and its corresponding port. The setting of bandwidth threshold and monitoring of actual traffic flow are performed by configuration function and management entity.

The CS&NM operational codes of Bandwidth Limitation are listed in the Table 20.

TABLE 20

Codes of Bandwidth Limitation frame

| CS&NM Frame Types | Code |
|---|---|
| Bandwidth Limitation_Request Frame | 00101111 |
| Bandwidth Limitation_Response Frame | 00110000 |

Note:
Bandwidth Limitation_Request Frame is a multicast frame and should be issued to two ends of targeted Tributary at the same time.

The parameter of Bandwidth Limitation_Request Frame includes the following elements:
Targeted (Tributary) Port A: TNi=NAx+TT+TNp
Targeted (Tributary) Port B: TNj=NAy+TT+TNq
Bandwidth required to be provided from Port A to Port B: a designated integer value (an octet) between 0 and Standard Bandwidth, e.g. binary code:01000100 represents 68*64 k/bits Bandwidth.

Bandwidth required to be provided from B to A: a designated integer value (an octet) between 0 and Standard Bandwidth, e.g. binary code:00100000 represents 32*64 k/bits Bandwidth (This is an example of asymmetrical bandwidth availability), binary code:00000000 represents no Bandwidth available, it is needed that customers use the operation of half duplex point-to-point from port A to port B.

Standard Bandwidth: the related standard (binary code of G.702 E1: 00100000) for TCE Minimum Granularity: 64 k/bits (binary code:00000001) for TCE Bandwidth from port A to port B and from port B to port A is independent each other. The separated bandwidth can be symmetrical or asymmetrical. All of these elements will be mapped to CS&NM control frame in the above order. Bandwidth Limitation_Response Frame uses two parameters: Bandwidth Limitation successful or Bandwidth Limitation unsuccessful shown in the Table 21.

TABLE 21

Parameters of Bandwidth Limitation_Response Frame

| CS&NM Frame Types | Code |
|---|---|
| Bandwidth Limitation successful | Binary "00000001 00010111 00000001 00000000" |
| Bandwidth Limitation unsuccessful | Binary "00000001 00011000 00000001 00000000" |

Bandwidth Limitation of Tributary Based can be used to operations of half duplex point-to-point, full duplex point-to-point, multicast and broadcast.

12.2 Tributary Merging with Symmetry and Asymmetry

The RPR entity provides a Merging Function Unit by which up to sixteen Tributaries of the same TT can be merged together to form a Tributary Merging Group (TMG). Up to eight TMGs can be established in a RPR or other topology node. The TMG is similar to one logical link and is very useful when the higher bandwidth of application is required. The member Tributary of a TMG must be of the same TT and configured in full-duplex mode. The benefits of forming a TMG are link redundancy, aggregate throughput, incremental bandwidth and load balancing on the TMGs. Once a TMG is formed, a TMG of TCE must be identified using only a TN value (It is usual the first member Tributary) in the corresponding frames of data, signalling and network management. For the upper layer application over a TMG, a logical channel can only be seen externally.

The CS&NM operational codes of Tributary Merging are listed in the Table 22.

TABLE 22

Codes of Tributary Merging frame

| CS&NM Frame Types | Code |
|---|---|
| Tributary Merging_Request Frame | 00110001 |
| Tributary Merging_Response Frame | 00110010 |

The parameter of Tributary Merging_Request Frame includes the following elements:
First Targeted Tributary: TNi=NAx+TT+TNp
Second Targeted Tributary: TNj=NAy+TT+TNq
Third Targeted Tributary: TNk=NAz+TT+TNr
Fourth Targeted Tributary: . . .

Tributary Merging from A to B and from B to A is independent each other. The Tributary Merging of two half-duplex channels can be symmetrical or asymmetrical. All of these elements will be mapped to CS&NM control frame in the above order. Tributary Merging_Response Frame uses two parameters: Tributary_Merging_successful or Tributary_Merging_unsuccessful shown in the Table 23.

TABLE 23

Parameters of Tributary Merging_Response Frame

| CS&NM Frame Types | Code |
| --- | --- |
| Tributary_Merging_successful | Binary "00000001 00011001 00000001 00000000" |
| Tributary_Merging_unsuccessful | Binary "00000001 00011010 00000001 00000000" |

Tributary Merging can be used to operations of half duplex point-to-point and full duplex point-to-point.

12.3 Tributary Based Security—Line-Speed Filtering

The RPR entity provides a Line-Speed Filtering Function Unit (LSFFU) of Tributary based to Content-Aware frame classification, which enables a node processing application to filter and classify frames based on certain protocol fields of upper layer in the payload of frame. Filters can be set on the used fields from Layer 2 to Layer 4 within a frame. LSFFU of a node can filter individual ingress or egress ports of Tributary. Filtering algorithm uses two constructs, (a) the filter mask, which uses which fields to filter, and (b) the rules table, which uses the filtering options. Up to 48 filters are available, each containing a 64-octet wide shuttered filter mask value to apply on any protocol field at any offset within the first 96 octets of the incoming frame. The rule table is up to 256 entries deep for TCE Tributary.

Once the classification results and filter match or partial match have been gotten, the following policies can be taken, or in their combination:

Modification of the IP Type Of Service (TOS precedence) field
  Delivery of a copy of the related frames to the domain of management
  Discarding the related frames
  Transferring the related frames to other egress port of a Tributary
  Transmission of a copy of the related frames to the "mirrored to" Tributary
  Modification of protocol field The LSFFU provides the ability to track and profile up to 1024 data flows. The traffic on these data flows can be monitored or regulated via internal meters and has the ability to assign two independent policies to the profile status of a data flow and execute these actions at line rate.

The CS&NM operational codes of Line-Speed Filtering are listed in the Table 24.

TABLE 24

Codes of Line-Speed Filtering frame

| CS&NM Frame Types | Code |
| --- | --- |
| Line-Speed Filtering_Request Frame | 00110011 |
| Line-Speed Filtering_Response Frame | 00110100 |

The parameter of Line-Speed Filtering_Request Frame includes the following elements:

Targeted Tributary: TNi=NAx+TT+TNp
  Modification of the IP Type Of Service (TOS precedence) field, binary code:10000001, the detailed operation is under study. Otherwise, binary code:00000000 will be used.
  Delivery of a copy of the related frames to the domain of management, binary code:10000010 represents that action of "Delivery of a copy of the related frames to the domain of management" will be taken. Otherwise, binary code:00000000 will be used.
  Discarding the related frames, binary code:10000011 represents that action of "Discarding the related frames" will be taken. Otherwise, binary code:00000000 will be used.
  Transferring the related frames to other egress port of a Tributary, binary code:10000100 represents that action of "Transferring the related frames to other egress port of a Tributary (This Tributary is presented as TNj=NAx+TT+TNq)" will be taken. So the octet "10000100" plus "TNj" will be used for this function. Otherwise, binary code:00000000 will be used.
  Modification of protocol field, binary code:10000101, the detailed operation is under study. Otherwise, binary code:00000000 will be used.

Line-Speed Filtering from A to B and from B to A is independent each other. The Line-Speed Filtering of two half-duplex channels can be selected to use or not use. All of these elements will be mapped to CS&NM control frame in the above order. Line-Speed Filtering_Response Frame uses two parameters: Line-Speed Filtering successful or Line-Speed Filtering unsuccessful shown in the Table 25.

TABLE 25

Parameters of Line-Speed Filtering_Response Frame

| CS&NM Frame Types | Code |
| --- | --- |
| Line-Speed_Filtering_successful | Binary "00000001 00011011 00000001 00000000" |
| Line-Speed_Filtering_unsuccessful | Binary "00000001 00011100 00000001 00000000" |

Tributary Merging can be used to operations of half duplex point-to-point and full duplex point-to-point.

13 Topology Application of Single Fibre Ring, Link-type, Broadcast Network and Pseudo-mesh

13.1 Providing of a Single Fibre Ring

This technology is used for a default application on a dual-ringlet structure. In some case of access, due to the limitation of fibre resource in which two fibres are available to a ring, it is recommended that a single fibre ring shown in the FIG. 12 be applied. If the topology is involved in FIG. 12, steering and wrapping, fairness, data node insertion and deletion should not be used. Instead, these functions will be switched off via configuration function of the network management. The data and control packet will share the same channel and RI (Ringlet Identifier) field is always set to "0".

Figure 12:
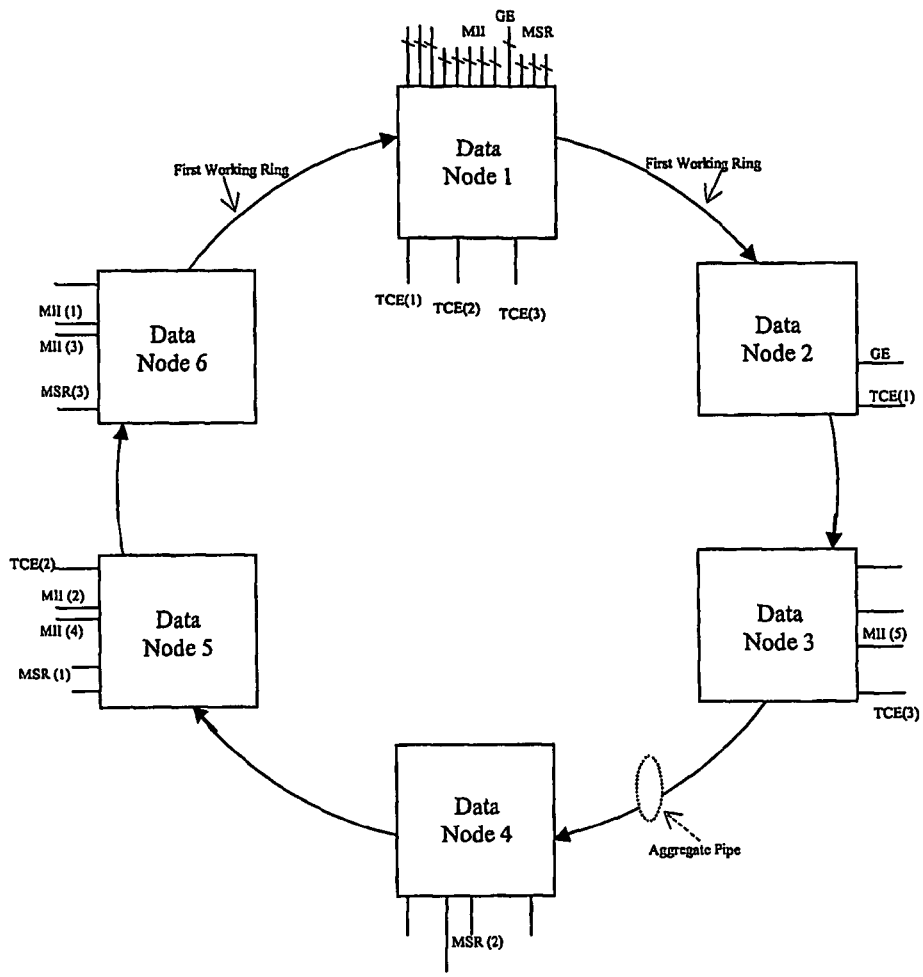
FIG. 12 illustrates the Single Fibre Ring of RPR according to one embodiment of the invention.

FIG. 12 Illustrates the Single Fibre Ring of RPR According to the Invention.

13.2 Providing of a Link-type with Adding and Dropping Tributary Services

Figure 13:
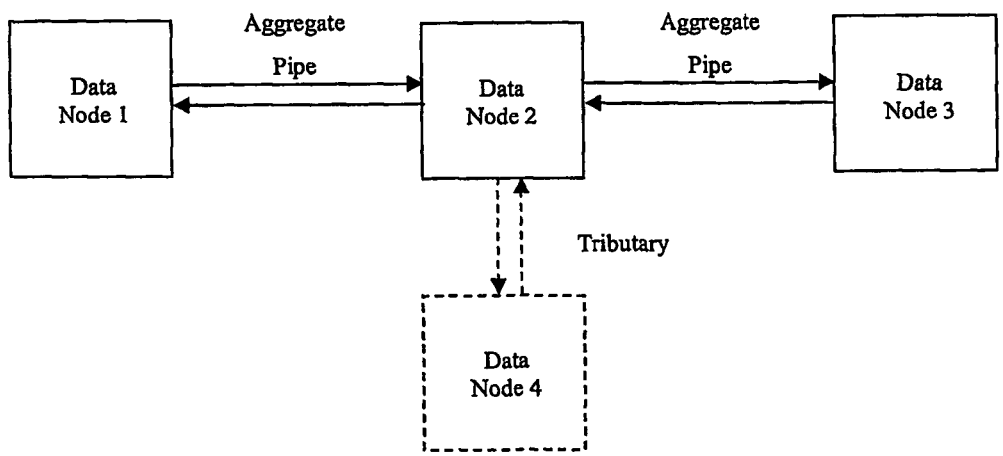
FIG. 13 shows A RPR Topology, Link-type with Adding and Dropping Tributary Services according to one embodiment of the invention.

In some application, it is needed to build a link-type topology shown in the FIG. 13 in which the connection between Node 2 and Node 4 (it is suppositional) is one or more Tributaries. This Tributary may be a Tributary of other RPR If the topology is involved in FIG. 13, steering and wrapping, data node insertion and deletion, fairness should not be used. Instead, these functions will be switched off via configuration function of the network management. The data and control packet will share the same channel and RI (Ringlet Identifier) field is always set to "0".

FIG. 13 shows A RPR Topology, Link-type with Adding and Dropping Tributary Services according to the invention.

Figure 14:
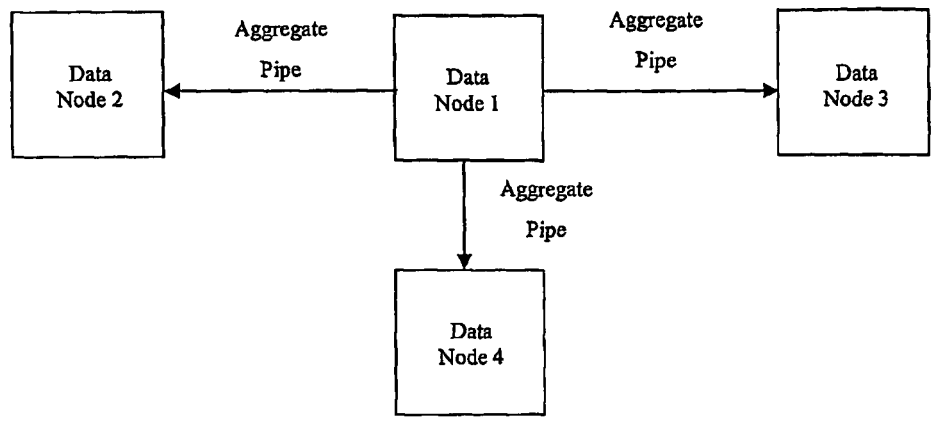
FIG. 14 shows A RPR Topology, Broadcast Connection to DVB Application according to one embodiment of the invention.

FIG. 14 shows A RPR Topology, Broadcast Connection to DVB Application according to the invention.

Figure 15:
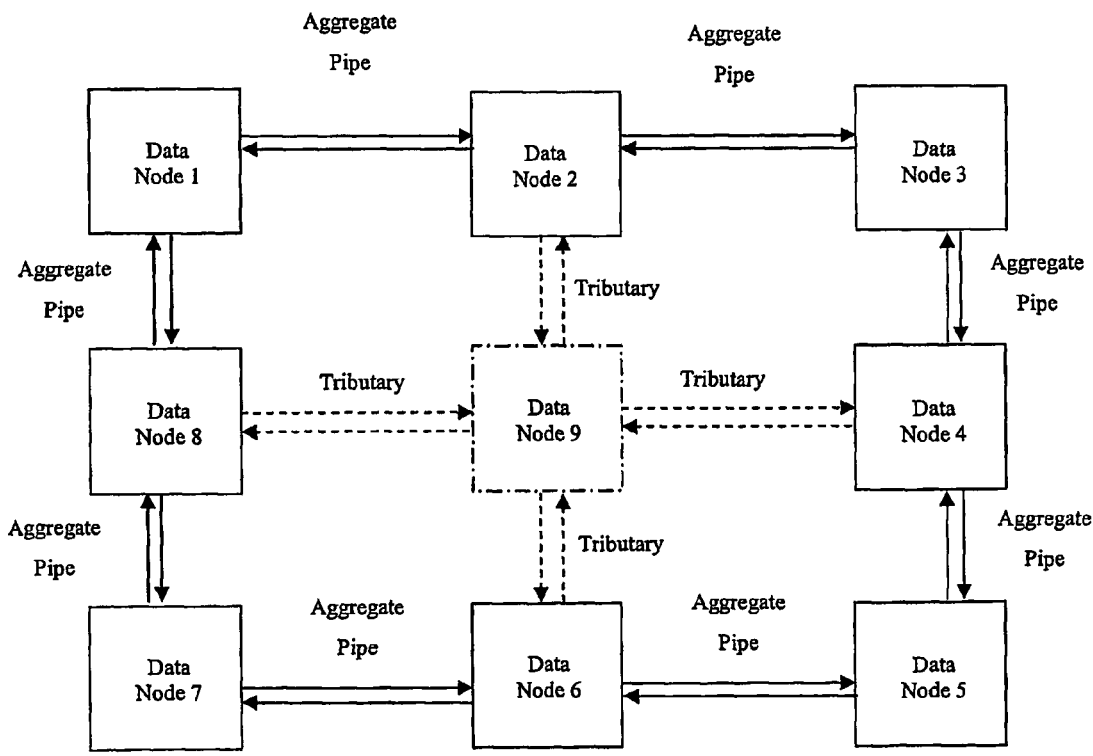
FIG. 15 shows a RPR Lite Topology, Pseudo-mesh Connection according to one embodiment of the invention.

FIG. 15 shows a RPR Lite Topology, Pseudo-mesh Connection according to the invention.

13.3 Providing of a Broadcast Connection to DVB Application

In DVB application for example, it is needed to build a broadcast network topology shown in the FIG. 14 in which the connections from Node 1 to Node2/3/4 are aggregate pipes of single direction. If the topology is involved in FIG. 14, the L2PS of aggregate pipe based, steering and wrapping, data node insertion and deletion, Tributary based Protection and in-band network management should not be used. Instead, these functions will be switched off via configuration function of the network management. The data and control packet will share the same channel and RI (Ringlet Identifier) field is always set to "0".

13.4 Providing of a Pseudo-mesh Topology

Pseudo-mesh Topology presented in FIG. 15 is a particular example of a ring. Eight Nodes via aggregate pipe are attached together to form a ring. The Tributaries of Node 2, 4, 6 and 8 are connected to the Node 9 (it is suppositional). In this application, all function and specifications used in this Technology can be used effectively.

14 The Physical Architecture of a RPR Lite Node

A physical architecture of a RPR Lite node node (out-of-band CS&NM bus) consists of (1) Aggregate circuit board (for working mode), which is responsible for the Aggregate. Processor, schedule of traffic bus from all tributaries, Routing Engine, L3 packet forwarding for IP packet, Processing unit of control signalling & Network Management within a node;

(2) Aggregate circuit board (for protection mode), which is responsible for the aggregate processor, schedule of traffic bus from all tributaries, routing engine, L3 packet forwarding for IP packet, processing unit of control signalling & network management within a node when aggregate circuit board (for working mode) is detected to be involved in failure. If the working board is recovered from failure, this board will be go back to protection mode. (3) Tributary circuit board, which is in charge of receive and transmission by traffic bus from Aggregate circuit board, the adaptation and processing of various independent adding/dropping tributary channel to/from the RPR Lite nodes, just like a series "Private Line or Private Circuit for Renting from Carrier". Tributary can be a various G.702 interfaces, ISDN, DVB, audioband, videoband. The different tributary can be assigned to different priority. In the transmission side, all services are sent in packet way after adaptation function of Tributary circuit board is performed. The access of all services is implemented in this board. This board does also receive CS&NM message from CS&NM bus.

(4) Traffic bus, which is responsible for the traffic information exchange between Aggregate circuit board and Tributary circuit board.

(5) CS & NM bus, which is responsible for the information exchange of CS& NM between Aggregate circuit board and Tributary circuit board. The PCI bus or RS-485 is a example of CS&NM bus.

Figure 16:
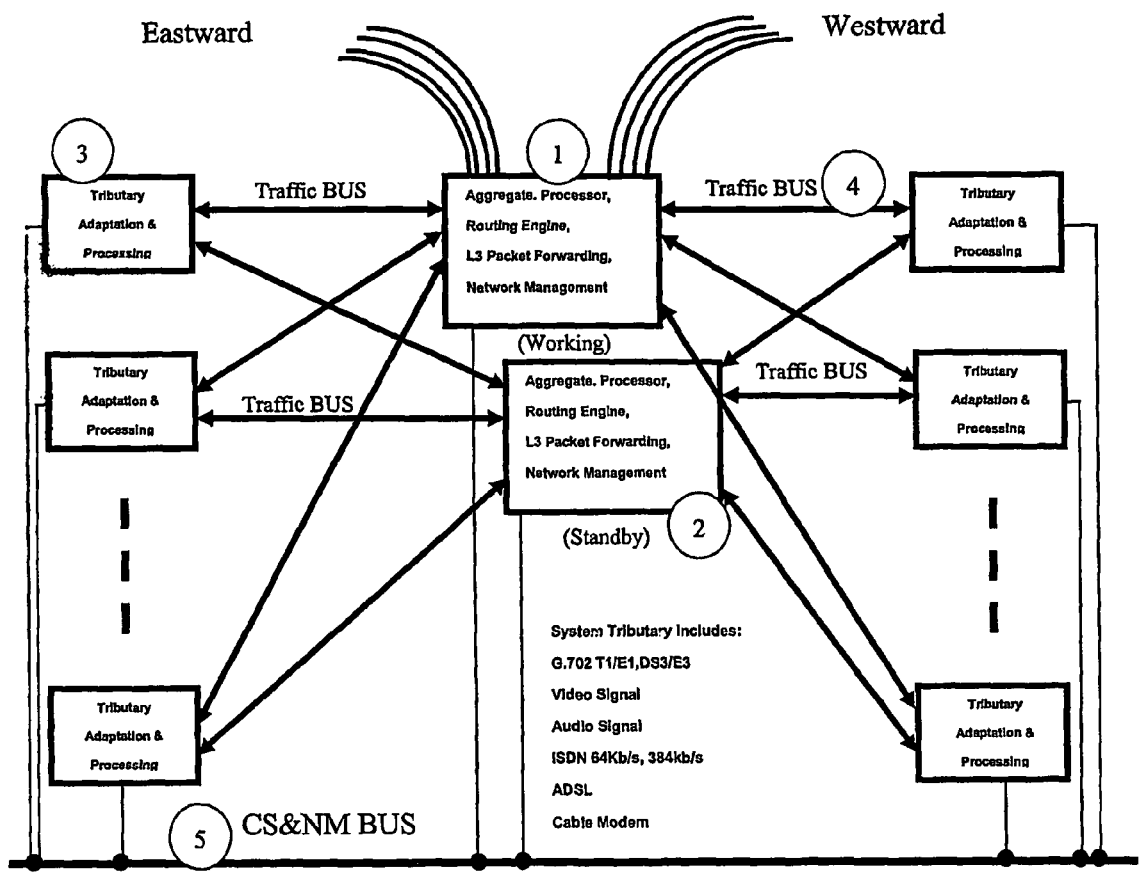
FIG. 16 shows the Physical Architecture of a RPR Lite node (Out-of-band CS&NM Bus) according to one embodiment of the invention.

Please refer to as FIG. 16.

FIG. 16 shows the Physical Architecture of a RPR Lite node (Out-of-band CS&NM Bus) according to the invention.

Figure 17:
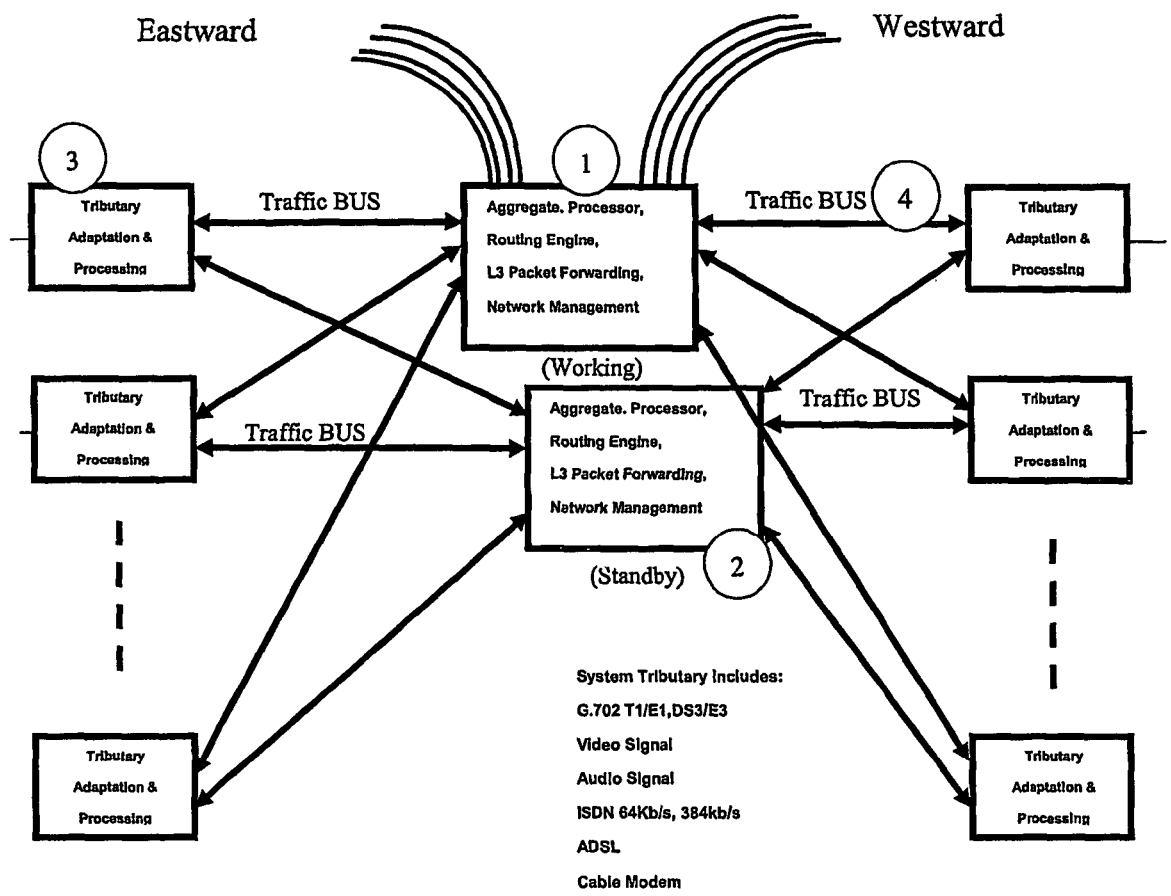
FIG. 17 shows the Physical Architecture of a RPR Lite node (in-band CS&NM Bus) according to one embodiment of the invention.

The FIG. 17 shows a physical architecture of a RPR Lite node) (in-band CS&NM bus) consisting of (1) Aggregate circuit board (for working mode), (2) Aggregate circuit board (for protection mode), (3) Tributary circuit board, this board does also receive CS&NM message from traffic bus.

(4) Traffic bus, which is responsible for the traffic information exchange between Aggregate circuit board and Tributary circuit board.

(5) CS & NM bus shares the physical channel of traffic, which is responsible for the information exchange of CS& NM between Aggregate circuit board and Tributary circuit board.

FIG. 17 shows the Physical Architecture of a RPR Lite node (in-band CS&NM Bus) according to the invention.

Figure 18:
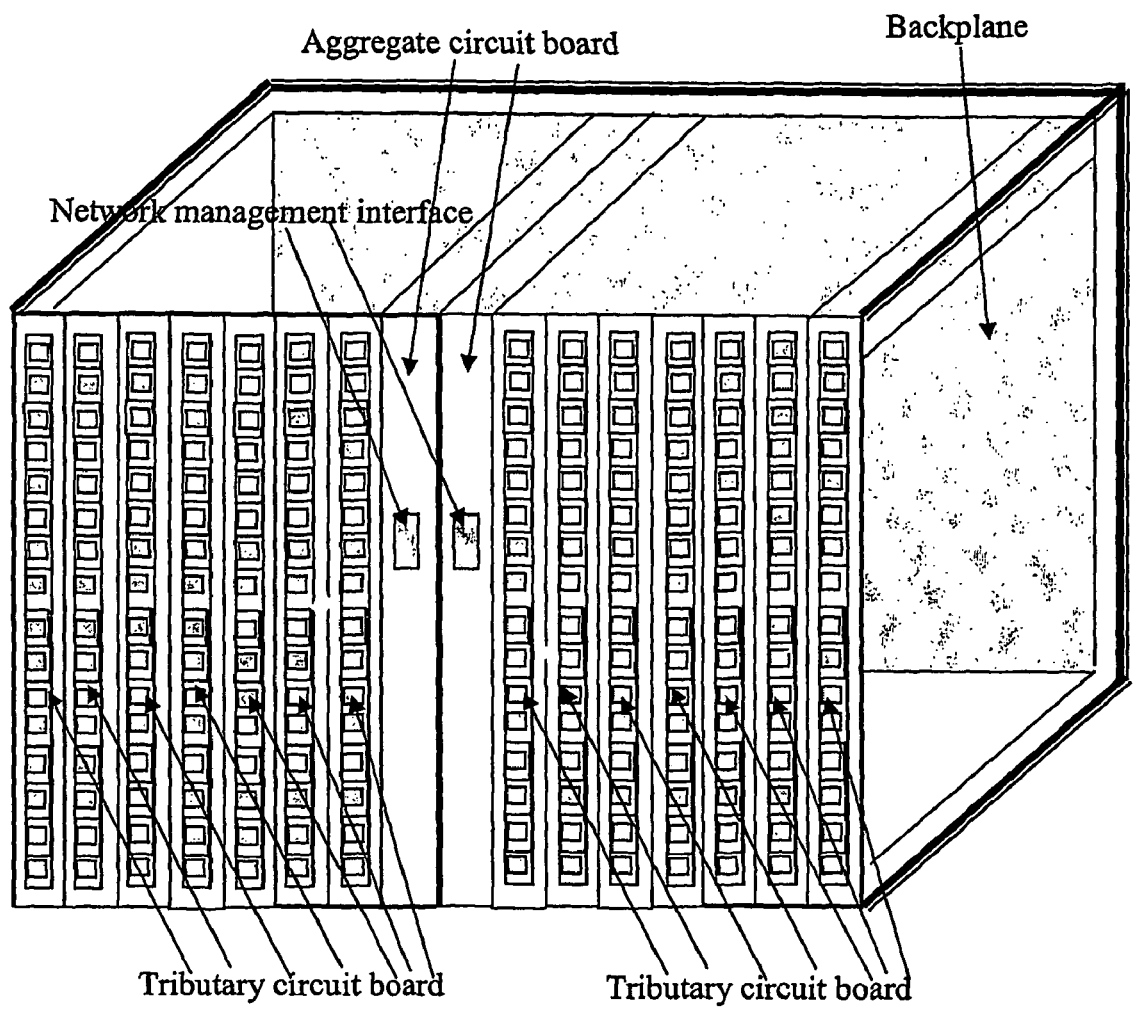
FIG. 18 shows Layout of system equipment of a RPR Lite node according to one embodiment of the invention.

FIG. 18 shows Layout of system equipment of a RPR Lite node according to the invention.

The layout of system equipment of a RPR Lite node is shown in FIG. 18, including the shelf, backplane, Aggregate circuit board (for working and protection respectively), fourteen Tributary circuit boards, network management interface etc.

INDUSTRIAL APPLICABILITY

From the above description to the preferred embodiments of the invention, it can be seen that the present invention provides the following capabilities over RPR, including RPR Lite, as a MAC client:

(1) The protocol encapsulation and transport of Ethernet, Gigabit Ethernet, and G.702 PDH circuit—Synchronous and asynchronous circuit transport, Video signal, Voiceband signal, Digital channel supported by 64 kbit/s-based ISDN etc over a two-fibre ring, a single fibre ring, a link-type and broadcast topology of fibres.

(2) Service (or tributary) based protection of 1+1, 1:1, and 1:N models within 50 ms.

(3) Service or tributary based multicast and station-based multicast and broadcast.

(4) Bandwidth limitation of service (or tributary) based with symmetry and asymmetry.

(5) Line-speed filtering of tributary based.

(6) Tributary based performance monitoring in 15-minute and 24-hour.

(7) Frame based transparent PPPoE and PPPoA transport from access to backbone along a MSR ring or other topologies, in order to simplify accounting mechanism (e.g. Radius), reduce maintenance work, and improve latency variation (compared to Layer 2 and Layer 3 switch) in Access network application.

In other words, the present invention provides tributary transparent transport with various existing data networks and services (e.g. Ethernet, FR, ATM, ISDN, DDN, G.702 etc), tributary based bandwidth management with symmetry and asymmetry (e.g. bandwidth limitation and tributary bundling), tributary based 1+1, 1:1 and 1:N protection within 50 ms, tributary based multicast, tributary based security application (e.g. line-speed filtering), tributary based performance monitoring in the 15-minute and 24 hour, and is also used to provide forwarding of XP data link frames (also being a tributary) similar to functionality found in a more complex routing data system. This invention is connection based and pre-plan solution, tributary bandwidth is programmable by network management system, or initiated by end user according to customer needs and payment. The way of the bandwidth allocation is changed from the fixed to dynamic.

It is to be understood that the above descriptions should not be construed as limitations on the scope of the invention, but rather as an exemplification of preferred embodiments thereof. Accordingly, the scope of the invention should be determined by the appended claims and their equivalents. Any variations or modifications within the spirit and scope of the invention are covered by the appended claims.

The invention claimed is:

1. A data transmission apparatus used in a multiple service ring (MSR) including at least two nodes coupled to at least one aggregate pipe and at least one tributary, said apparatus comprising:

a tributary TX framer coupled to said tributaries for converting data received from said tributaries into XP processing protocol data packets;

a transmission setup module for setting-up information indicating the destination node address and destination tributary for XP packets to be transmitted;

a TX framer for encapsulating said information indicating the destination node address and destination tributary and the XP packets into frames of the multiple service ring and transmitting the same along an aggregate pipe to a downstream neighbor node in the ring;

a RX framer for receiving and deframing data frames of the multiple service ring from a upstream neighbor node along an aggregate pipe to obtain at least a destination node address and XP packets;

a transiting module for transiting the frames destined to other nodes to said TX framer so as to forward the frames destined to other nodes to a next node;

a destination tributary determining module for determining a destination tributary of the XP packets for local node; and a tributary RX framer for converting said XP packets for local node from the RX framer into data of format of local tributary and sending the local tributary data to a corresponding tributary determined by said destination tributary determining module, wherein said multiple service ring is based on RPR Lite, and said RX framer is RPR MAC RX framer and said TX framer is RPR MAC TX framer.

2. The data transmission apparatus according to claim 1, wherein said transiting module transits the frames destined to other nodes at a fast and almost fixed rate.

3. The data transmission apparatus according to claim 1, wherein said destination tributary determining module includes a discriminator for determining whether said received packets for local node are unicast, multicast or broadcast; a tributary member copying module for making copies of the packets for each of the corresponding tributary if multicast or broadcast is determined within a membership group in a node; and tributary identifier determining module for determining destination tributary from TT and TN fields in the received frames.

4. The data transmission apparatus according to claim 3, wherein said transmission setup module sets up destination node address (NA), and TT and TN fields for indicating the type and NO. of the destination tributary.

5. The data transmission apparatus according to claim 4, further comprising a Tx schedule unit for scheduling the transmission of data frames according to a priority of the frames, and decide which frame will go first to the downstream along the ringlet.

6. The data transmission apparatus according to claim 5, further comprising a TTBP unit for performing tributary based protection to provide at least one tributary to be used as a standby in case of failure of the used tributaries.

7. The data transmission apparatus according to claim 6, wherein said TTBP unit provides 1+1 TTBP to designate a mate Standby Tributary with the same service property, source and sink in which payloads of the mate Working Tributary and Standby Tributary carries the same traffic, and Once TTBP occurred for this working tributary, said standby will replace this working tributary within 50 ms.

8. The data transmission apparatus according to claim 6, wherein said TTBP unit provides 1:1 TTBP to designate a mate Standby Tributary with the same service property, source and sink in which payloads of the Standby Tributary can run the other additional traffic, and once TTBP occurred for this Working Tributary, the additional traffic will be dropped out within 50 ms.

9. The data transmission apparatus according to claim 6, wherein said TTBP unit provides 1:N TTBP to designate a mate Standby Tributary with the same service property, source and sink in which payloads of the Standby Tributary runs the other additional traffic, and once TTBP in one of N Working Tributary occurred, this additional traffic will be dropped out within 50 ms.

10. The data transmission apparatus according to claim 3, wherein said tributary includes bandwidth management unit with symmetry and asymmetry and tributary based filter targeting at one or more fields of MAC frame, XP frame, IP packet or TCP/UDP packet.

11. The data transmission apparatus according to claim 10, wherein said MSR does not use Fairness arithmetic and uses either a local or a global node address, and pre-plan strategy.

12. The data transmission apparatus according to claim 4, further comprising a frame sequence number generator for generating frame sequence number sequentially with respect to a specified modulus for each of the data frames to be transmitted at the transmitting side; and at the receiving side, a FSN extractor for extracting a FSN with respect to a peer-to-peer modulus from the received data frames; a counter at the receiving side for counting the number of the received data frames; and a comparator for comparing the counted frame number with the extracted FSN, if mismatch, an error reflecting transport performance is indicated.

13. The data transmission apparatus according to claim 12, wherein said destination tributary determining module gets TT, TN, a value of CS&NM and FSN from the received frames from the upstream node, and said transmission setup module attaches TT, TN, a value of CS&NM and FSN into the data frames to be transmitted.

14. The data transmission apparatus according to claim 13, wherein said RPR framer, and the transiting module are of IEEE802.17 MAC layer; said tributary RX framer, said transmission setup module, and said destination tributary determining module, said FSN generator, FSN extractor, counter, and comparator are of the XP layer, and said tributary TX framer is of tributary processing layer.

15. The data transmission apparatus according to claim 14, wherein said tributary processing layer further comprises a tributary adaptation function unit for said signal and rate transform, synchronous function between two sides of peer to peer.

16. A data transmission method used in a multiple service ring including at least two nodes coupled to at least one aggregate pipe and at least one tributary, said apparatus comprising:
receiving data from a tributary and converting the received data into XP processing protocol data packets;
setting-up information indicating the destination node address and destination tributary for XP packets to be transmitted;
encapsulating said information indicating the destination node address and destination tributary and the XP packets into frames of the multiple service ring and transmitting the same along an aggregate pipe to a downstream neighbor node in the ring;
receiving and deframing data frames of the multiple service ring from a upstream neighbor node along an aggregate pipe to obtain at least a destination node address and XP packets;
transiting the frames destined to other nodes so as to forward the frames destined to other nodes to a next node;
determining a destination tributary of the XP packets for local node; and
converting said XP packets for local node into data of format of local tributary and sending the local tributary data to a corresponding tributary determined by said destination tributary determining step,
wherein said multiple service ring is based on RPR Lite, and said RX framer is RPR MAC RX framer and said TX framer is RPR MAC TX framer.

17. The data transmission method according to claim 16, wherein said transiting step transits the frames destined to other nodes at a fast and almost fixed rate.

18. The data transmission method according to claim 16, wherein said destination tributary determining step includes a discriminating step for determining whether said received packets for local node are unicast, multicast or broadcast; a tributary member copying module for making copies of the packets for each of the corresponding tributary if multicast or broadcast is determined within a membership group in a node; and tributary identifier determining module for determining destination tributary from TT and TN fields in the received frames.

19. The data transmission method according to claim 18, wherein said transmission setup step sets up destination node address (NA), and TT and TN fields for indicating the type and NO. of the destination tributary.

20. The data transmission method according to claim 19, further comprising a Tx scheduling step before the TX framing step for scheduling the transmission of data frames according to a priority of the frames, and decide which frame will go first to the downstream along the ringlet.

21. The data transmission method according to claim 20, further comprising a TTBP step for performing tributary based protection to provide at least one tributary to be used as a standby in case of failure of the used tributaries.

22. The data transmission method according to claim 21, wherein said TTBP step provides 1+1 TTBP to designate a mate Standby Tributary with the same service property, source and sink in which payloads of the mate Working Tributary and Standby Tributary carries the same traffic, and Once TTBP occurred for this working tributary, said standby will replace this working tributary within 50 ms.

23. The data transmission method according to claim 21, wherein said TTBP step provides 1:1 TTBP to designate a mate Standby Tributary with the same service property, source and sink in which payloads of the Standby Tributary can run the other additional traffic, and once TTBP occurred for this Working Tributary, the additional traffic will be dropped out within 50 ms.

24. The data transmission method according to claim 21, wherein said TTBP step provides 1:N TTBP to designate a mate Standby Tributary with the same service property, source and sink in which payloads of the Standby Tributary runs the other additional traffic, and once TTBP in one of N Working Tributary occurred, this additional traffic will be dropped out within 50 ms.

25. The data transmission method according to claim 18, wherein said tributary includes bandwidth management with symmetry and asymmetry and tributary based filter targeting at one or more fields of MAC frame, XP frame, IP packet or TCP/UDP packet.

26. The data transmission method according to claim 25, wherein said MSR does not use Fairness arithmetic and uses either a local or a global node address, and pre-plan strategy.

27. The data transmission method according to claim 19, further comprising the steps of: generating frame sequence number sequentially with respect to a specified modulus for each of the data frames to be transmitted at the transmitting side; and
at the receiving side, extracting a FSN with respect to a peer-to-peer modulus from the received data frames; counting the number of the received data frames; and comparing the counted frame number with the extracted FSN, if mismatch, an error reflecting transport performance is indicated.

28. The data transmission method according to claim 27, wherein said destination tributary determining step gets TT, TN, a value of CS&NM and FSN from the received frames from the upstream node, and said transmission setup step attaches TT, TN, a value of CS&NM and FSN into the data frames to be transmitted.

29. The data transmission method according to claim 28, wherein said RPR framing, and the transiting are performed in IEEE802.17 MAC layer; said tributary RX framing, said transmission setup step, and said destination tributary determining step, said FSN generating, FSN extracting, counting, and comparing steps are performed in the XP layer, and said tributary TX framing is performed in the tributary processing layer.

30. The data transmission method according to claim 29, wherein said tributary processing layer further comprises a tributary adaptation function for said signal and rate transform, synchronous function between two sides of peer to peer.

* * * * *